United States Patent
Donderici et al.

(10) Patent No.: US 10,900,345 B2
(45) Date of Patent: Jan. 26, 2021

(54) MAGNETIC RANGING SYSTEMS AND METHODS USING RANDOM ELECTRIC SPARK EXCITATION

(71) Applicant: Halliburton Energy Services, Inc., Houston, TX (US)

(72) Inventors: Burkay Donderici, Pittsford, NY (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/461,190

(22) PCT Filed: Jun. 20, 2018

(86) PCT No.: PCT/US2018/038398
§ 371 (c)(1),
(2) Date: May 15, 2019

(87) PCT Pub. No.: WO2019/245541
PCT Pub. Date: Dec. 26, 2019

(65) Prior Publication Data
US 2020/0190966 A1 Jun. 18, 2020

(51) Int. Cl.
*E21B 47/0228* (2012.01)
*E21B 47/13* (2012.01)
(Continued)

(52) U.S. Cl.
CPC .......... *E21B 47/0228* (2020.05); *E21B 7/15* (2013.01); *E21B 47/024* (2013.01); *E21B 47/13* (2020.05); *G01V 3/26* (2013.01)

(58) Field of Classification Search
CPC ........ E21B 47/0228; E21B 47/13; E21B 7/15; E21B 47/024
See application file for complete search history.

(56) References Cited

U.S. PATENT DOCUMENTS

| 4,741,405 A | 5/1988 | Moeny et al. |
| 9,181,754 B2 | 11/2015 | Donderici et al. |

(Continued)

FOREIGN PATENT DOCUMENTS

| WO | 2008/003092 | 1/2008 |
| WO | 2010/017866 | 3/2010 |

OTHER PUBLICATIONS

International Search Report and Written Opinion received for PCT Patent Application No. PCT/US2018/038398, dated Jun. 20, 2018; 9 pages.

*Primary Examiner* — Caroline N Butcher
(74) *Attorney, Agent, or Firm* — Benjamin Ford; Baker Botts L.L.P.

(57) ABSTRACT

A downhole drilling system may include a pulse-generating circuit; a drill bit including a first and second electrode electrically coupled to the pulse generating circuit to receive an electrical pulse from the pulse-generating circuit and to form an electrical arc between the first and second electrodes during a pulsed drilling operation in a first wellbore; a sensor to record responses to a magnetic field generated by a current in a second wellbore, the current generated by the electrical arc; and a sensor analysis system communicatively coupled to the sensor, the sensor analysis system configured to obtain a measurement from the sensor, the measurement representing the recorded response to the magnetic field and determine a distance between the drill bit and the second wellbore based on the measurement.

23 Claims, 14 Drawing Sheets

(51) Int. Cl.
*E21B 47/024* (2006.01)
*E21B 7/15* (2006.01)
*G01V 3/26* (2006.01)

(56) References Cited

U.S. PATENT DOCUMENTS

| | | |
|---|---|---|
| 2011/0163891 A1 | 7/2011 | Wilson et al. |
| 2011/0308859 A1 | 12/2011 | Bittar et al. |
| 2013/0032404 A1* | 2/2013 | Donderici ............... E21B 49/00 |
| | | 175/45 |
| 2015/0219783 A1 | 8/2015 | Sitka |
| 2016/0003029 A1* | 1/2016 | Hay ........................ E21B 17/00 |
| | | 702/7 |
| 2018/0258754 A1* | 9/2018 | Guner ................... E21B 47/092 |

* cited by examiner

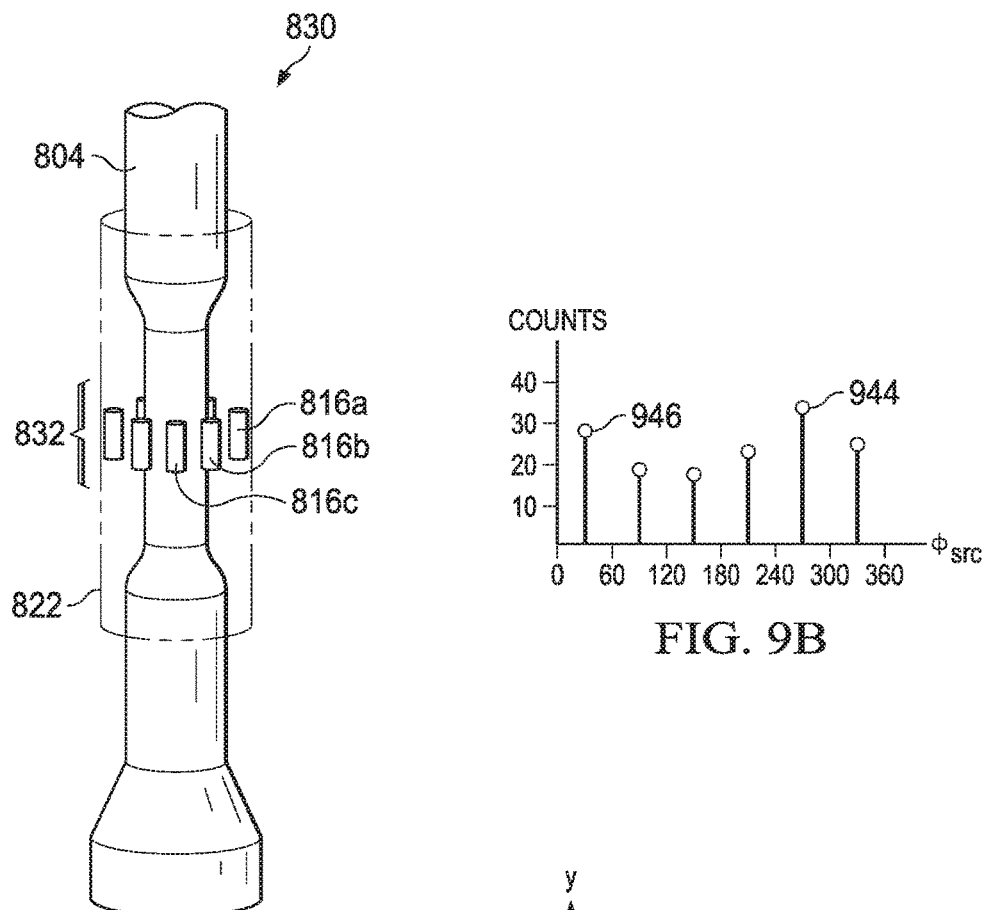
FIG. 8C
FIG. 9B
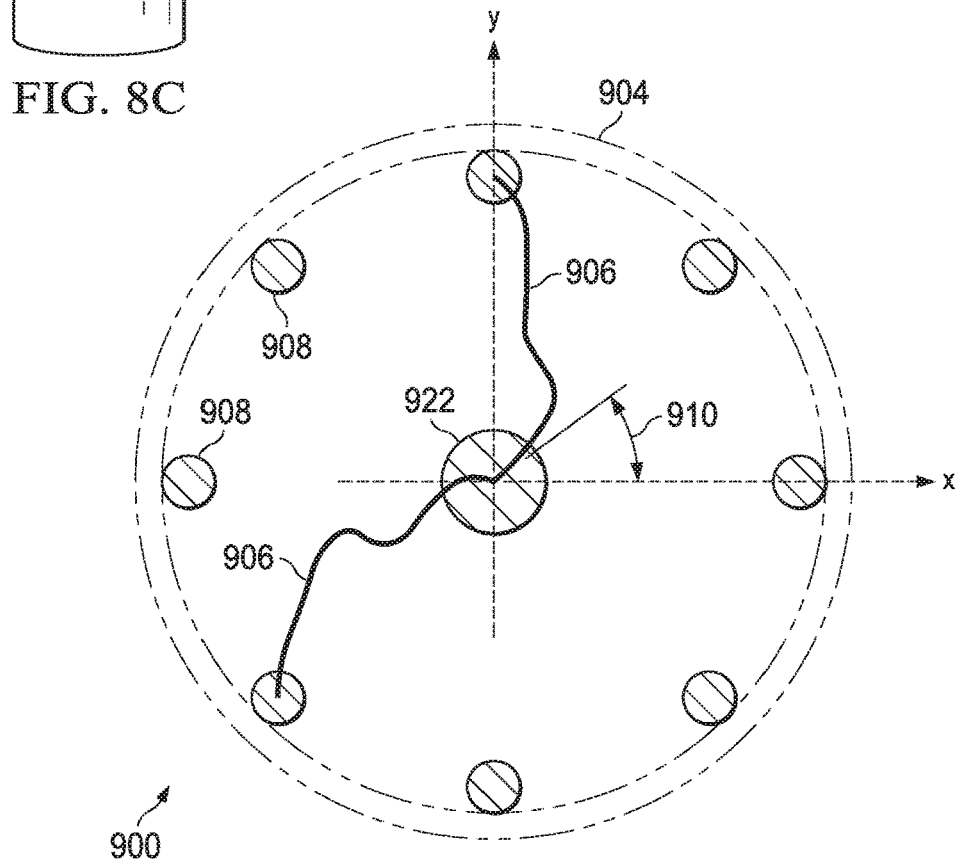
FIG. 9A

MAGNETIC RANGING SYSTEMS AND METHODS USING RANDOM ELECTRIC SPARK EXCITATION

RELATED APPLICATIONS

This application is a U.S. National Stage Application of International Application No. PCT/US2018/038398 filed Jun. 20, 2018, which designates the United States, and which is incorporated herein by reference in its entirety.

TECHNICAL FIELD

The present disclosure relates generally to downhole pulsed-power drilling and, more particularly, to magnetic ranging systems for downhole pulsed-power drilling.

BACKGROUND

Electrocrushing drilling uses pulsed-power technology to drill a wellbore in a rock formation. Pulsed-power technology repeatedly applies a high electric potential across the electrodes of a pulsed-power drill bit, which ultimately causes the surrounding rock to fracture. The fractured rock is carried away from the bit by drilling fluid and the bit advances downhole. Electrocrushing drilling operations may also be referred to as pulsed drilling operations.

BRIEF DESCRIPTION OF THE DRAWINGS

For a more complete understanding of the present disclosure and its features and advantages, reference is now made to the following description, taken in conjunction with the accompanying drawings, in which:

FIG. 8C is an elevation view of exemplary components of a measurement system including multiple magnetometers that are associated with the bottom hole assembly (BHA) of the pulsed-power drilling system;

FIG. 9A is a cross sectional view of exemplary components of a bottom-hole assembly of a pulsed-power drilling system that is associated with a sensor analysis system;

FIG. 9B is a graph illustrating bins with responses from multiple sensors azimuthally distributed around a centerline of the bottom-hole assembly (BHA) of the pulsed-power drilling system;

DETAILED DESCRIPTION

Figure 1:
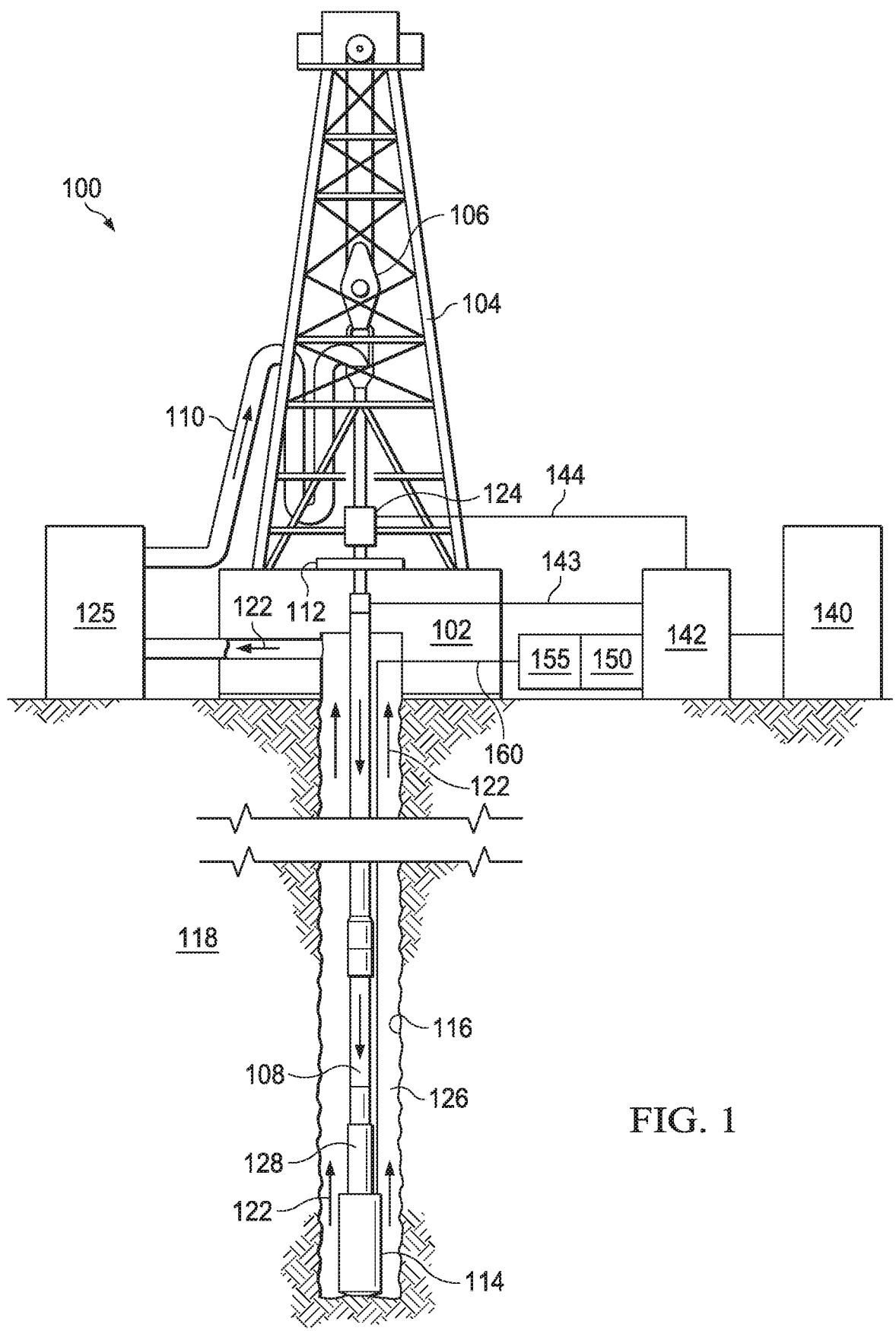
FIG. 1 is an elevation view of an exemplary pulsed-power drilling system used in a wellbore environment.

Electrocrushing drilling may be used to form wellbores in subterranean rock formations for recovering hydrocarbons, such as oil and gas, from these formations. Electrocrushing drilling uses pulsed-power technology to fracture the rock formation by repeatedly delivering electrical arcs or high-energy shock waves to the rock formation. More specifically, a drill bit of a pulsed-power drilling system is excited by a train of high-energy electrical pulses that produce high power discharges through the formation at the downhole end of the drill. The high-energy electrical pulses, in turn, fracture part of the formation surrounding the drilling tool and produce electromagnetic and acoustic waves that carry information about properties of the formation. The azimuthal angles over which discharges take place between electrodes at the tip of the drill bit may occur randomly along those azimuthal angles for which the formation is still intact.

As described in detail herein, a pulsed-power drilling system with an associated sensor analysis system may implement logging-while-drilling techniques that include using electrical and/or electromagnetic sensors to record responses to the electromagnetic waves provided during a pulsed drilling operation. The sensors may be located on the surface and/or downhole to record responses to the electromagnetic waves produced by pulsed-power drilling operations as they travel through and reflect off various layers in the formation and are received by the sensors. Moreover, sensors may record responses to secondary electromagnetic waves produced by a current in other wellbores. The current may be created by the electromagnetic waves produced by pulsed-power drilling operations. The shape and magnitude of waves received by the sensors carry information that may be used to estimate properties of the formation layers through which the reflected waves have passed. The propagation time of a given reflection may be indicative of the distance traveled and may be used to generate a map of the formation properties as a function of distance.

The sensors may convert the recorded signals into one or more measurements in a form suitable for analysis by a sensor analysis system. The resulting measurements may represent voltages, currents, measurements of electric field strength, measurements of magnetic field strength, or any combinations thereof. The measurements may be provided by the sensors to a sensor analysis system, where they may be analyzed or stored for subsequent processing. The sensor analysis system may process the measurements received from the sensors. The results of an inversion process whose inputs include such measurements may be used to determine the distance and/or direction of another wellbore to avoid, intercept, or maintain the direction of pulsed-power drilling operations and/or for other purposes based on electrical or acoustic properties detected by the sensors.

There are numerous ways in which a ranging system may determine the distance and/or direction to a target wellbore based on responses recorded during a pulsed drilling operation. Thus, embodiments of the present disclosure and its advantages are best understood by referring to FIGS. 1 through 12, where like numbers are used to indicate like and corresponding parts.

FIG. 1 is an elevation view of an exemplary pulsed-power drilling system used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation including generally horizontal, multilateral, or directional.

Drilling system 100 includes drilling platform 102 that supports derrick 104 having traveling block 106 for raising and lowering drill string 108. Drilling system 100 may also include pump 125, which circulates drilling fluid 122 through a feed pipe to kelly 110, which in turn conveys drilling fluid 122 downhole through interior channels of drill string 108 and through one or more fluid flow ports in pulsed-power drill bit 114. Drilling fluid 122 circulates back to the surface via annulus 126 formed between drill string 108 and the sidewalls of wellbore 116. Fractured portions of the formation are carried to the surface by drilling fluid 122 to remove those fractured portions from wellbore 116.

Pulsed-power drill bit 114 is attached to the distal end of drill string 108 and may be an electrocrushing drill bit or an electrohydraulic drill bit. Power may be supplied to drill bit 114 from components downhole, components at the surface and/or a combination of components downhole and at the surface. For example, generator 140 may generate electrical power and provide that power to power-conditioning unit 142. Power-conditioning unit 142 may then transmit electrical energy downhole via surface cable 143 and a sub-surface cable (not expressly shown in FIG. 1) contained within drill string 108 or attached to the side of drill string 108. A pulse-generating circuit within BHA 128 may receive the electrical energy from power-conditioning unit 142, and may generate high-energy electrical pulses to drive drill bit 114. The pulse-generating circuit may include a power source input, including two input terminals, and a first capacitor coupled between the input terminals. The pulse-generating circuit may also include a switch, a transformer, and a second capacitor whose terminals are coupled to respective electrodes of drill bit 114. The switch may include a mechanical switch, a solid-state switch, a magnetic switch, a gas switch, or any other type of switch suitable to open and close the electrical path between the power source input and a first winding of the transformer. The transformer generates a current through a second winding when the switch is closed and current flows through first winding. The current through the second winding charges the second capacitor. As the voltage across the second capacitor increases, the voltage across the electrodes of the drill bit increases.

The pulse-generating circuit within BHA 128 may be utilized to repeatedly apply a large electric potential, for example up to or exceeding 150 kV, across the electrodes of drill bit 114. Each application of electric potential is referred to as a pulse. When the electric potential across the electrodes of drill bit 114 is increased enough during a pulse to generate a sufficiently high electric field, an electrical arc forms through rock formation 118 at the bottom of wellbore 116. The arc temporarily forms an electrical coupling between the electrodes of drill bit 114, allowing electric current to flow through the arc inside a portion of the rock formation at the bottom of wellbore 116. The arc greatly increases the temperature and pressure of the portion of the rock formation through which the arc flows and the surrounding formation and materials. The temperature and pressure are sufficiently high to break the rock itself into small bits or cuttings. This fractured rock is removed, typically by drilling fluid 122, which moves the fractured rock away from the electrodes and uphole. The terms "uphole" and "downhole" may be used to describe the location of various components of drilling system 100 relative to drill bit 114 or relative to the bottom of wellbore 116 shown in FIG. 1, rather than to describe relative directions in terms of true up or true down. Therefore, if wellbore 116 is a horizontal wellbore or is otherwise angled away from vertical, the term "uphole" may refer to the direction away from drill bit 114, regardless of whether that direction is to the right, to the left, up, or down relative to drill bit 114. For example, a first component described as uphole from a second component may be further away from drill bit 114 and/or the bottom of wellbore 116 than the second component. Similarly, a first component described as being downhole from a second component may be located closer to drill bit 114 and/or the bottom of wellbore 116 than the second component. The electrical arc may also generate acoustic and/or electromagnetic waves that are transmitted within rock formation 118 and/or drilling fluid 122. Sensors placed within wellbore 116 and/or on the surface may record responses to high-energy electrical pulses, electrical arcs, or the acoustic waves and/or electromagnetic waves. Sensor analysis system 150 may receive measurements representing the recorded responses and may analyze the measurements to determine characteristics of rock formation 118 or for other purposes.

Wellbore 116, which penetrates various subterranean rock formations 118, is created as drill bit 114 repeatedly fractures the rock formation and drilling fluid 122 moves the fractured rock uphole. Wellbore 116 may be any hole formed into a subterranean formation or series of subterranean formations for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a subterranean formation or series of subterranean formations for the purpose of geothermal power generation.

Although pulsed-power drill bit 114 is described above as implementing electrocrushing drilling, pulsed-power drill bit 114 may also be used for electrohydraulic drilling, rather than generating an electrical arc within the rock, drill bit 114 applies a large electrical potential across one or more electrodes and a ground ring to form an arc across the drilling fluid proximate to the downhole end of wellbore 116. The high temperature of the arc vaporizes the portion of the drilling fluid immediately surrounding the arc, which in turn generates a high-energy shock wave in the remaining fluid. The one or more electrodes of electrohydraulic drill bit may be oriented such that the shock wave generated by the arc is transmitted toward the bottom of wellbore 116. When the shock wave contacts and bounces off of the rock at the bottom of wellbore 116, the rock fractures. Accordingly, wellbore 116 may be formed in subterranean formation 118 using drill bit 114 that implements either electrocrushing or electrohydraulic drilling.

Distributed acoustic sensing (DAS) subsystem 155 may be positioned at the surface for use with pulsed-power drilling system 100, or at any other suitable location. DAS subsystem 155 may be coupled to optical fiber 160, which is positioned within a portion of the pulsed-power drilling system 100. For example, optical fiber 160 may be positioned within wellbore 116. Any suitable number of DAS subsystems (each coupled to an optical fiber 160 located downhole) may be placed inside or adjacent to wellbore 116. With optical fiber 160 positioned inside a portion of wellbore 116, DAS subsystem 155 may determine characteristics associated with formation 118 based on changes in strain caused by acoustic waves. DAS subsystem 155 may be configured to transmit optical pulses into optical fiber 160, and to receive and analyze reflections of the optical pulse to detect changes in strain caused by acoustic waves.

Figure 5:
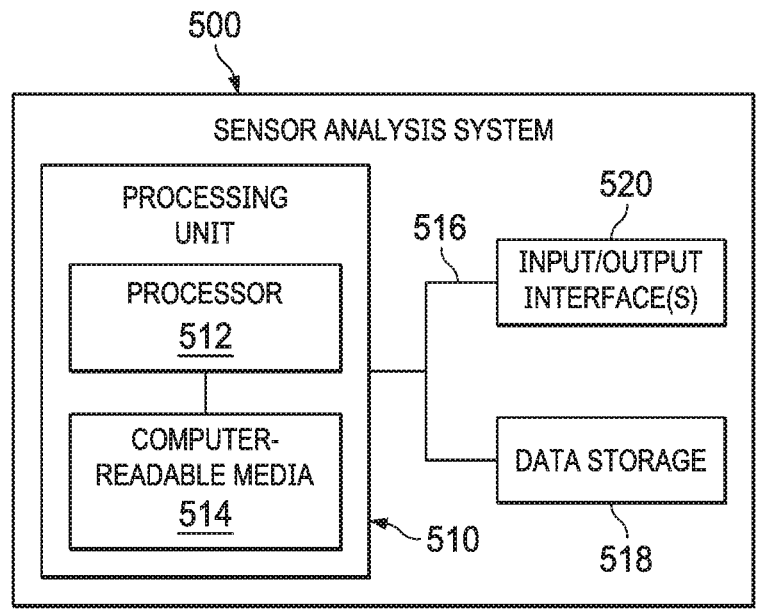
FIG. 5 is a block diagram illustrating an exemplary sensor analysis system associated with a pulsed-power drilling system.

Sensor analysis system 150 may be positioned at the surface for use with pulsed-power drilling system 100 as illustrated in FIG. 1, or at any other suitable location. Any suitable telemetry system may be used for communicating signals from various acoustic, electrical or electromagnetic sensors at the surface or downhole to sensor analysis system 150 during a pulsed drilling operation. For example, sensor analysis system 150 may be coupled to optical fiber 160 that extends downhole in wellbore 116. More specifically, one or more input/output interfaces of sensor analysis system 150 may be coupled to optical fiber 160 for communication to and from acoustic, electrical or electromagnetic sensors positioned downhole. For example, the sensors may transmit measurements to sensor analysis systems. Any suitable number of sensor analysis systems 150 (each of which may be coupled to an optical fiber located downhole) may be placed inside or adjacent to wellbore 116. An example sensor analysis system is illustrated in FIG. 5 and described in more detail below.

Optical fiber 160 may be enclosed within a cable, rope, line, or wire. More specifically, optical fiber 160 may be enclosed within a slickline, a wireline, coiled tubing, or another suitable conveyance for suspending a downhole tool in wellbore 116. Optical fiber cable 160 may be charged by a laser to provide power to DAS subsystem 155, sensor analysis system 150, or sensors located within wellbore 116.

Figure 2A:
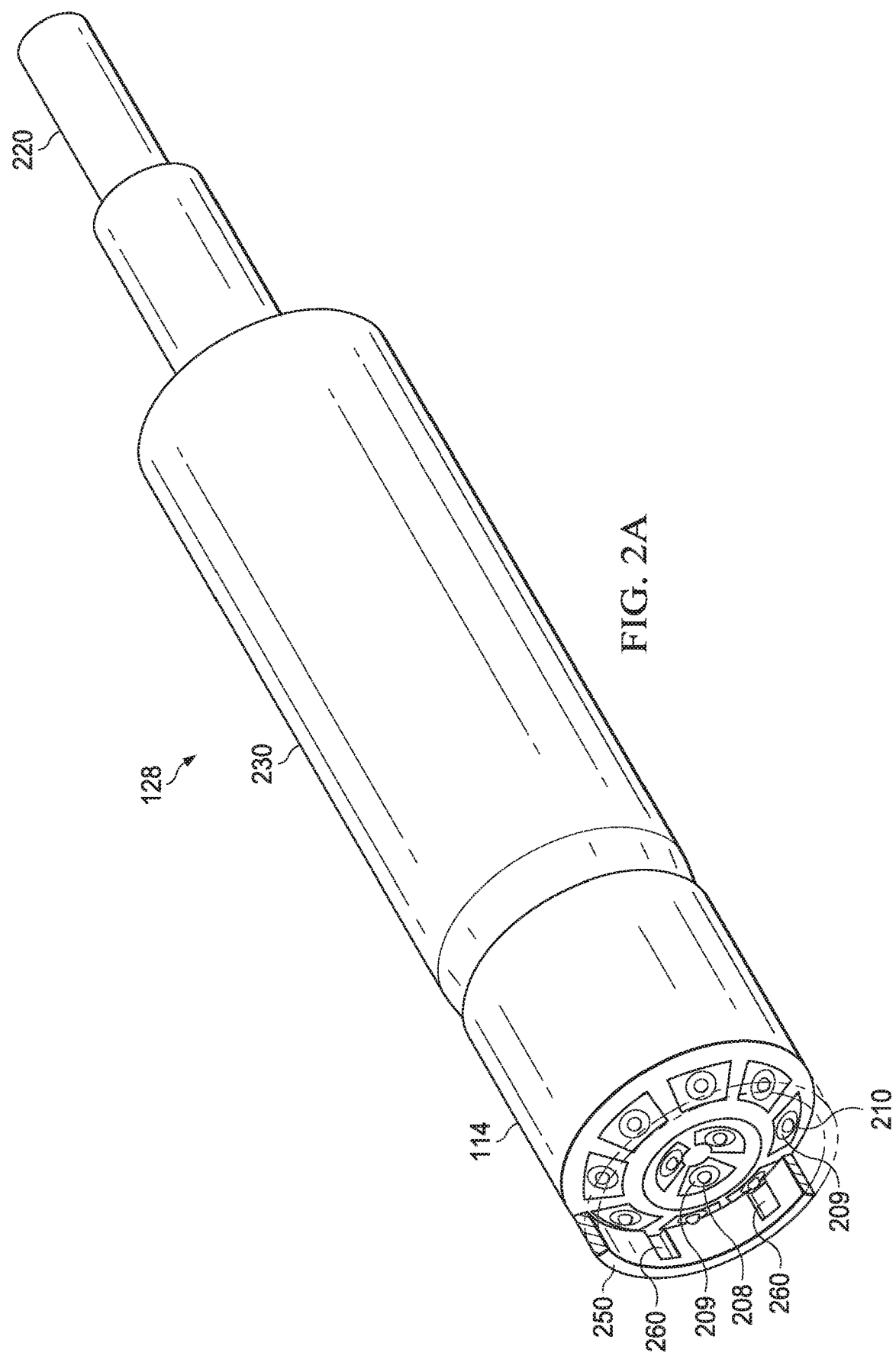
FIG. 2A is a perspective view of exemplary components of a bottom-hole assembly for a pulsed-power drilling system.

FIG. 2A is a perspective view of exemplary components of bottom-hole assembly for a pulsed-power drilling system. BHA 128 may include pulsed-power tool 230 and drill bit 114. For the purposes of the present disclosure, drill bit 114 may be integrated within BHA 128, or may be a separate component coupled to BHA 128. Pulsed-power tool 230 may provide pulsed electrical energy to drill bit 114.

Pulsed-power tool 230 receives electrical power from a power source via cable 220. For example, pulsed-power tool 230 may receive electrical power via cable 220 from a power source located on the surface as described above with reference to FIG. 1, or from a power source located downhole such as a generator powered by a mud turbine. Pulsed-power tool 230 may also receive electrical power via a combination of a power source located on the surface and a power source located downhole. Drill bit 114 may include ground ring 250, shown in part in FIG. 2A. Ground ring 250 may function as an electrode. Pulsed-power tool 230 converts electrical power received from the power source into high-energy electrical pulses that are applied across electrodes 208 and ground ring 250 of drill bit 114. Pulsed-power tool 230 may also apply high-energy electrical pulses across electrode 210 and ground ring 250 in a similar manner as described for electrode 208 and ground ring 250. Pulsed-power tool 230 may include a pulse-generating circuit as described above in reference to FIG. 1.

Although illustrated as a contiguous ring in FIG. 2A, ground ring 250 may be non-contiguous discrete electrodes and/or implemented in different shapes. Each of electrodes 208 and 210 may be positioned at a minimum distance from ground ring 250 of approximately 0.4 inches and at a maximum distance from ground ring 250 of approximately 4 inches. The distance between electrodes 208 or 210 and ground ring 250 may be based on the parameters of the pulsed drilling operation and/or on the diameter of drill bit 114. For example, the distance between electrodes 208 or 210 and ground ring 250, at their closest spacing, may be at least 0.4 inches, at least 1 inch, at least 1.5 inches, or at least 2 inches.

Drilling fluid 122 is typically circulated through drilling system 100 at a flow rate sufficient to remove fractured rock from the vicinity of drill bit 114. In addition, drilling fluid 122 may be under sufficient pressure at a location in wellbore 116, particularly a location near a hydrocarbon, gas, water, or other deposit, to prevent a blowout. Drilling fluid 122 may exit drill string 108 via openings 209 surrounding each of electrodes 208 and 210. The flow of drilling fluid 122 out of openings 209 allows electrodes 208 and 210 to be insulated by the drilling fluid. A solid insulator (not expressly shown) may surround electrodes 208 and 210. Drill bit 114 may also include one or more fluid flow ports 260 on the face of drill bit 114 through which drilling fluid 122 exits drill string 108, for example fluid flow ports 260 on ground ring 250. Fluid flow ports 260 may be simple holes, or they may be nozzles or other shaped features. Because fines are not typically generated during pulsed-power drilling, as opposed to mechanical drilling, drilling fluid 122 may not need to exit the drill bit at as high a pressure as the drilling fluid in mechanical drilling. As a result, nozzles and other features used to increase drilling fluid pressure may not be needed on drill bit 114. However, nozzles or other features to increase drilling fluid 122 pressure or to direct drilling fluid may be included for some uses. Additionally, the shape of a solid insulator, if present, may be selected to enhance the flow of drilling fluid 122 around the components of drill bit 114.

If drilling system 100 experiences vaporization bubbles in drilling fluid 122 near drill bit 114, the vaporization bubbles may have deleterious effects. For instance, vaporization bubbles near electrodes 208 or 210 may impede formation of the arc in the rock. Drilling fluid 122 may be circulated at a flow rate also sufficient to remove vaporization bubbles from the vicinity of drill bit 114. Fluid flow ports 260 may permit the flow of drilling fluid 122 along with any fractured rock or vaporization bubbles away from electrodes 208 and 210 and uphole.

Figure 2B:
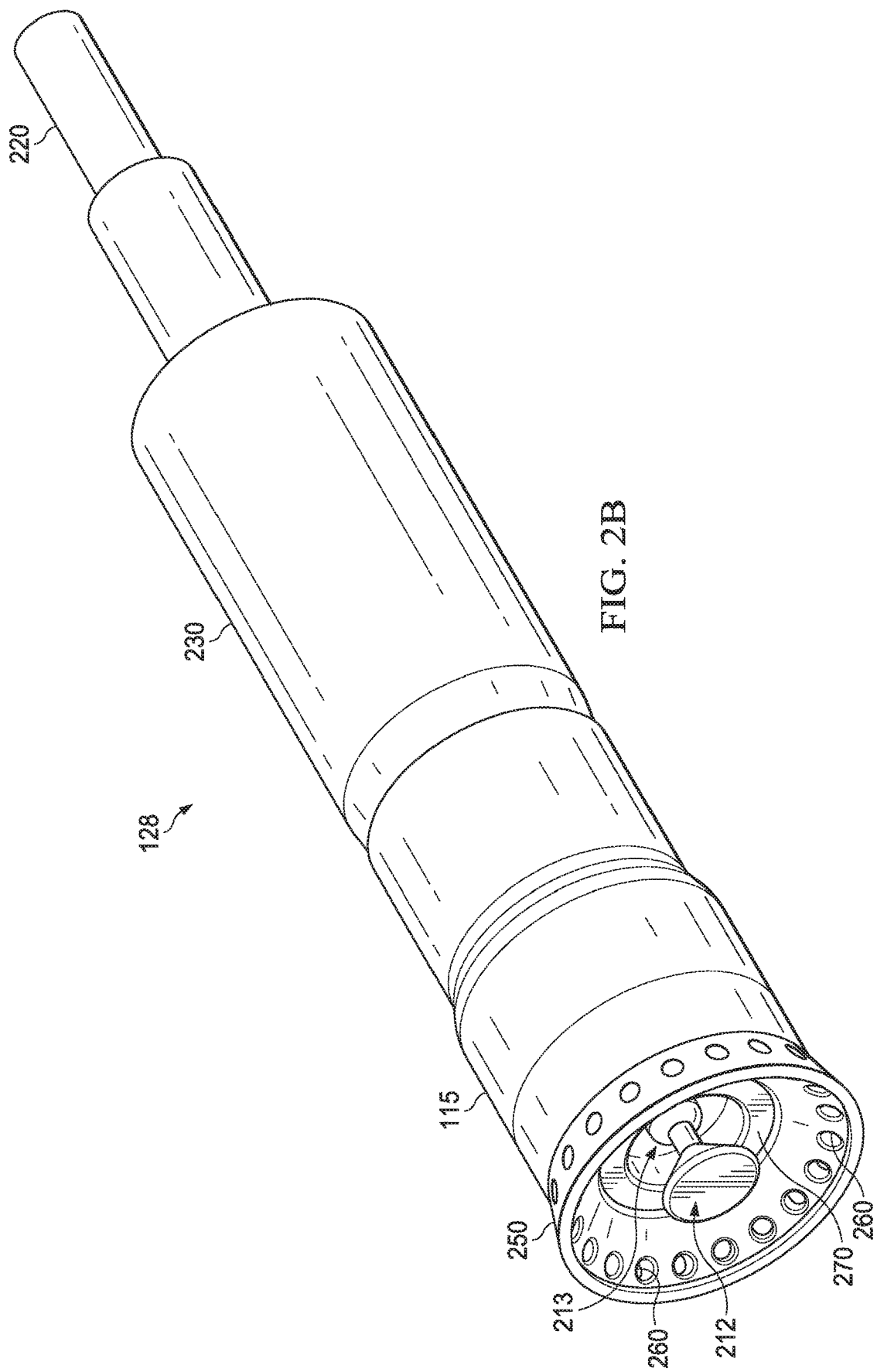
FIG. 2B is a perspective view of exemplary components of a bottom-hole assembly for a pulsed-power drilling system.

FIG. 2B is a perspective view of exemplary components of bottom-hole assembly for a pulsed-power drilling system. BHA 128 may include pulsed-power tool 230 and drill bit 115. For the purposes of the present disclosure, drill bit 115 may be integrated within BHA 128, or may be a separate component that is coupled to BHA 128. BHA 128 and pulsed-power tool 230 may include features and functionalities similar to those discussed above in FIG. 2A.

Drill bit 115 may include bit body 255, electrode 212, ground ring 250, and solid insulator 270. Electrode 212 may be placed approximately in the center of drill bit 115. Electrode 212 may be positioned at a minimum distance from ground ring 250 of approximately 0.4 inches and at a maximum distance from ground ring 250 of approximately 4 inches. The distance between electrode 212 and ground ring 250 may be based on the parameters of the pulsed drilling operation and/or on the diameter of drill bit 115. For example, the distance between electrode 212 and ground ring 250, at their closest spacing, may be at least 0.4 inches, at least 1 inch, at least 1.5 inches, or at least 2 inches. The distance between electrode 212 and ground ring 250 may be generally symmetrical or may be asymmetrical such that the electric field surrounding the drill bit has a symmetrical or asymmetrical shape. The distance between electrode 212 and ground ring 250 allows drilling fluid 122 to flow between electrode 212 and ground ring 250 to remove vaporization bubbles from the drilling area. Electrode 212 may have any suitable diameter based on the pulsed drilling operation, on the distance between electrode 212 and ground ring 250, and/or on the diameter of drill bit 115. For example, electrode 212 may have a diameter between approximately 2 and approximately 10 inches (i.e., between approximately 51 and approximately 254 millimeters). Ground ring 250 may function as an electrode and provide a location on the drill bit where an electrical arc may initiate and/or terminate.

Drill bit 115 may include one or more fluid flow ports on the face of the drill bit through which drilling fluid exits the drill string 108. For example, ground ring 250 of drill bit 115 may include one or more fluid flow ports 260 such that drilling fluid 122 flows through fluid flow ports 260 carrying fractured rock and vaporization bubbles away from the drilling area. Fluid flow ports 260 may be simple holes, or they may be nozzles or other shaped features. Drilling fluid 122 is typically circulated through drilling system 100 at a flow rate sufficient to remove fractured rock from the vicinity of drill bit 115. In addition, drilling fluid 122 may be under sufficient pressure at a location in wellbore 116, particularly a location near a hydrocarbon, gas, water, or other deposit, to prevent a blowout. Drilling fluid 122 may exit drill string 108 via opening 213 surrounding electrode 212. The flow of drilling fluid 122 out of opening 213 allows electrode 212 to be insulated by the drilling fluid. Because fines are not typically generated during pulsed-power drilling, as opposed to mechanical drilling, drilling fluid 122 may not need to exit the drill bit at as high a pressure as the drilling fluid in mechanical drilling. As a result, nozzles and other features used to increase drilling fluid pressure may not be needed on drill bit 115. However, nozzles or other features to increase drilling fluid 122 pressure or to direct drilling fluid may be included for some uses. Additionally, the shape of solid insulator 270 may be selected to enhance the flow of drilling fluid 122 around the components of drill bit 115.

As described above with reference to FIGS. 1, 2A, and 2B, when the electric potential across electrodes of a pulsed-power drill bit becomes sufficiently large, an electrical arc forms through the rock formation and/or drilling fluid that is near the electrodes. The arc provides a temporary electrical short between the electrodes, and thus allows electric current to flow through the arc inside a portion of the rock formation and/or drilling fluid at the bottom of the wellbore. The arc increases the temperature of the portion of the rock formation through which the arc flows and the surrounding formation and materials. The temperature is sufficiently high to vaporize any water or other fluids that might be proximate to the arc and may also vaporize part of the rock itself. The vaporization process creates a high-pressure gas which expands and, in turn, fractures the surrounding rock.

Pulsed-power drilling systems and pulsed-power tools may utilize any suitable pulse-generating circuit topology to generate and apply high-energy electrical pulses across electrodes within the pulsed-power drill bit. Such pulse-generating circuit topologies may utilize electrical resonance to generate the high-energy electrical pulses required for pulsed-power drilling. The pulse-generating circuit may be shaped and sized to fit within the circular cross-section of pulsed-power tool 230, which as described above with reference to FIGS. 2A and 2B, may form part of BHA 128. The pulse-generating circuit may be enclosed within an encapsulant, such a thermally conductive material that protects the pulse-generating circuit from the wide range of temperatures (for example, from approximately 10 to approximately 200 degrees Centigrade) within the wellbore.

The pulsed-power drilling systems described herein may generate multiple electrical arcs per second using a specified excitation current profile that causes a transient electrical arc to form and arc through the most conducting portion of the wellbore floor. As described above, the arc causes that portion of the wellbore floor to disintegrate or fragment and be swept away by the flow of drilling fluid. As the most conductive portions of the wellbore floor are removed, subsequent electrical arcs may naturally seek the next most conductive portion. Therefore, obtaining measurements from which estimates of the excitation direction can be generated may provide information usable in determining characteristics of the formation.

Figure 3:
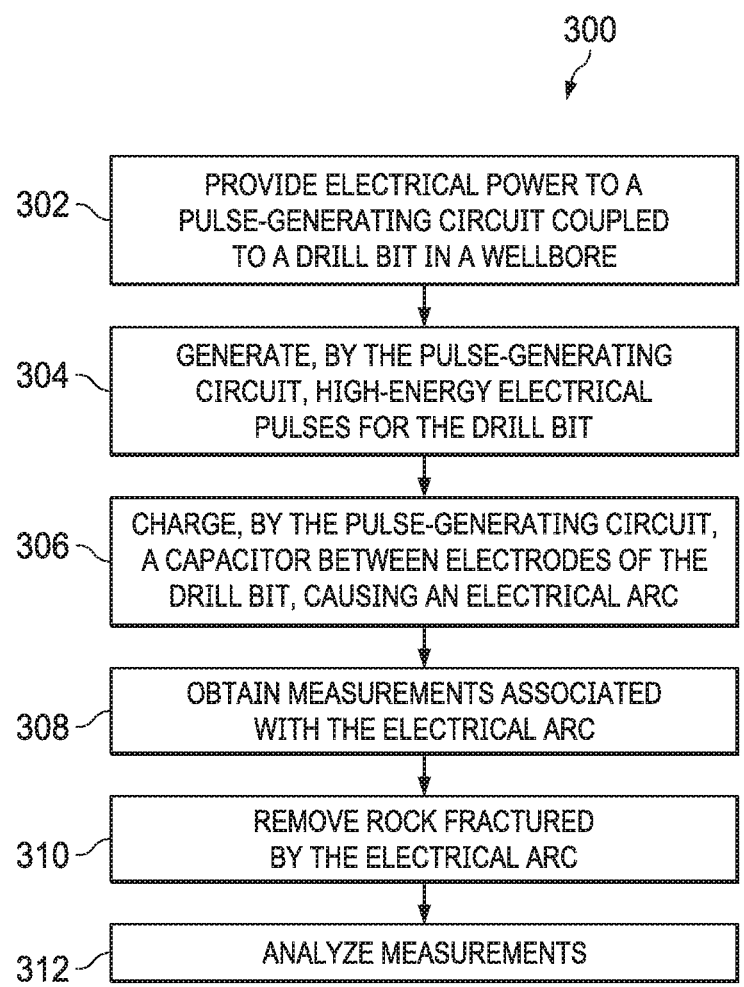
FIG. 3 is a flow diagram of an exemplary method for performing a pulsed drilling operation.

FIG. 3 is a flow chart illustrating an exemplary method 300 for performing a pulsed drilling operation using an electrocrushing drill bit or an electrohydraulic drill bit placed downhole in a wellbore. For example, drill bit 114 illustrated in FIG. 2A or drill bit 115 illustrated in FIG. 2B may be placed downhole in wellbore 116 as shown in FIG. 1. Method 300 includes, at 302, providing electrical power to a pulse-generating circuit coupled to the drill bit. For example, the pulse-generating circuit may be coupled to a first electrode and a second electrode of the drill bit. The first electrode may be electrode 208, 210, or 212 and the second electrode may be ground ring 250 discussed above with respect to FIGS. 2A and 2B. The pulse-generating circuit may be implemented within pulsed-power tool 230 shown in FIGS. 2A and 2B, and may receive electrical power from a power source on the surface, from a power source located downhole, or from a combination of a power source on the surface and a power source located downhole. Electrical power may be supplied downhole to a pulse-generating circuit by way of a cable, such as cable 220 described above with respect to FIGS. 2A and 2B. The power may be provided to the pulse-generating circuit within pulse-power tool 230 at a power source input.

At 304, high-energy electrical pulses are generated by the pulse-generating circuit for the drill bit by converting the electrical power received from the power source into high-energy electrical pulses. For example, the pulse-generating circuit may use electrical resonance to convert a low-voltage power source (for example, approximately 1 kV to approximately 5 kV) into high-energy electrical pulses capable of applying at least 150 kV across electrodes of the drill bit.

At 306, the pulse-generating circuit charges a capacitor between electrodes of the drill bit, causing an electrical arc. For example, a switch located downhole within the pulse-generating circuit may close to charge a capacitor that is electrically coupled between the first electrode and the second electrode. The switch may close to generate a high-energy electrical pulse and may be open between pulses. The switch may be a mechanical switch, a solid-state switch, a magnetic switch, a gas switch, or any other type of switch. Accordingly, as the voltage across the capacitor increases, the voltage across the first electrode and the second electrode increases. As described above with reference to FIGS. 1, 2A and 2B, when the voltage across the electrodes becomes sufficiently large, an electrical arc may form through the drilling fluid and/or a rock formation that is proximate to the electrodes. The arc may provide a temporary electrical short between the electrodes, and thus may discharge, at a high current level, the voltage built up across the capacitor.

At 308, measurements associated with the electrical arc are obtained. For example, one or more acoustic, electrical and/or electromagnetic sensors may record responses to received signals including, but not limited to, high-energy electrical pulses, electrical arcs, or acoustic and/or electromagnetic waves produced by the electrical arc during a pulsed drilling operation, and may provide measurements representing the recorded responses to a sensor analysis system, such as sensor analysis system 150 illustrated in FIG. 1 or sensor analysis system 500 illustrated in FIG. 5.

As described above with reference to FIGS. 1, 2A and 2B, the electrical arc greatly increases the temperature of the portion of the rock formation through which the arc flows as well as the surrounding formation and materials, such that the rock formation at the bottom of the wellbore may be fractured with the electrical arc. The temperature may be sufficiently high to vaporize any water or other fluids that may be touching or near the arc and may also vaporize part of the rock itself. The vaporization process creates a high-pressure gas which expands and, in turn, fractures the surrounding rock. At 310, rock fractured by the electrical arc may be removed from the end of the wellbore. For example, as described above with reference to FIG. 1, drilling fluid 122 may move the fractured rock away from the electrodes and uphole from the drill bit. As described above with respect to FIGS. 2A and 2B, drilling fluid 122 and the fractured rock may flow away from electrodes through fluid flow ports 260 on the face of the drill bit or on a ground ring of the drill bit.

At 312, the measurements obtained at 308 are analyzed to determine characteristics of the rock formation or for other purposes. For example, a sensor analysis system, such as sensor analysis system 150 in FIG. 1, may use measurements, such as a voltage, current, ratio of voltage to current, or magnetic field strength representing one or more responses recorded by one or more sensors, to determine the distance and/or direction to a target wellbore. The analysis may include one or more inversions, as described with respect to FIG. 6, FIGS. 10A-C, and/or FIG. 11.

Modifications, additions, or omissions may be made to method 300 without departing from the scope of the disclosure. For example, the order of the steps may be performed in a different manner than that described and some steps may be performed at the same time. Additionally, each individual step may include additional steps without departing from the scope of the present disclosure. The operations of method 300 illustrated in FIG. 3 may be repeated, as needed, to perform a pulsed drilling operation.

Figure 4:
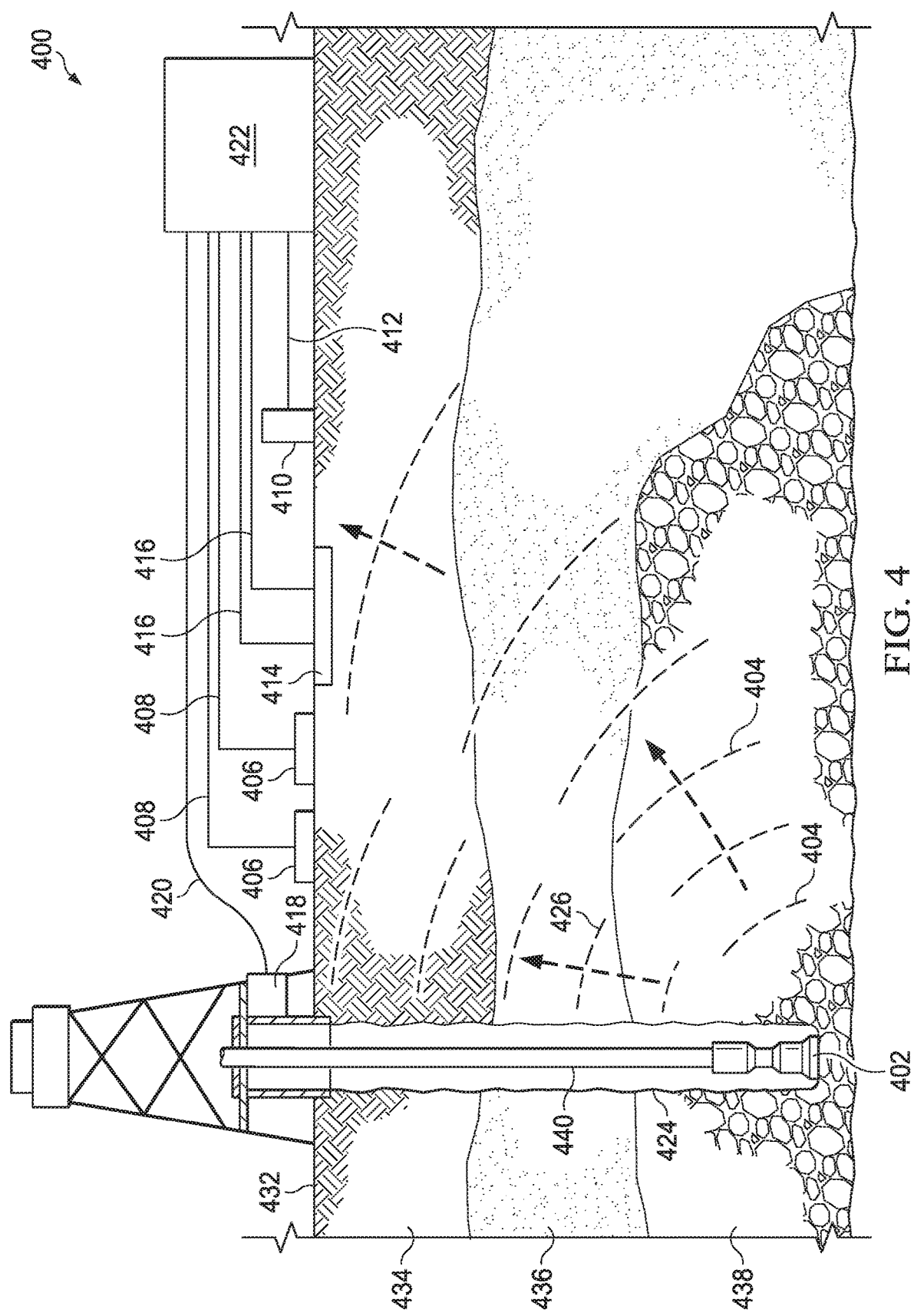
FIG. 4 is a block diagram illustrating an elevation view of an exemplary measurement system for pulsed-drilling.

FIG. 4 is an elevation view of an exemplary measurement system associated with a pulsed drilling system. Measurement system 400 may include sensor analysis system 422 that receives data from one or more of sensors 406, 410, 414 and 418 via one or more of interfaces 408, 412, 416, and 420. A pulsed-power drilling system may include a pulsed-power drill bit 402 that is located at the distal end of wellbore 424. During a pulsed drilling operation, electromagnetic waves 404 and acoustic waves 426 may be created by electric arcs formed proximate to drill bit 402. Electromagnetic waves 404 may propagate through one or more of subterranean layers 438, 436, 434 before reaching surface 432. Acoustic waves 426 may propagate through one or more subterranean layers and uphole along wellbore 424 from drill bit 402 to surface 432 and travel through one or more of subterranean layers 438, 436, 434. One or more of sensors 406, 410, 414 and 418 may be located in wellbore 424 and/or on surface 432. The sensors may be located a known distance from drill bit 402. The sensors may record responses to received signals including, but not limited to, high-energy electrical pulses, electrical arcs, electromagnetic waves 404 and/or acoustic waves 426 created during a pulsed drilling operation. The sensors may send one or more measurements representing the recorded responses to sensor analysis system 422, which analyzes the measurements. One or more components of sensor analysis system 422 may be located on surface 432, in wellbore 424, and/or at a remote location. For example, sensor analysis system 422 may include a measurement processing subsystem in wellbore 424 that processes measurements provided by one or more of the sensors and transmits the results of the processing uphole to another component of sensor analysis system 422 for storage and/or further processing.

During a pulsed drilling operation, high-energy electrical pulses are applied to the electrodes of drill bit 402 to build up electric charge at the electrodes. The rock in the surrounding formation fractures when an electrical arc forms at drill bit 402. Electromagnetic waves 404 are created by the current associated with the electrical arc and/or the electric charge built up on the electrodes of drill bit 402. In addition, acoustic waves 404 are created by the electrical arc and subsequent fracturing of rock in the formation proximate to the drill bit.

The duration of an electrical arc created during a pulsed drilling operation may be approximately 100 µs. The duration of the electrical arc may be shorter than the duration of the high-energy electrical pulses that are applied to the electrodes of drill bit 402, which may repeat on the order of several to a few hundred hertz. Because the duration of the electrical arc is less than the repetition period of the pulses, electrical arcs that are generated at drill bit 402 may be represented by a series of impulses in which each impulse has a corresponding electromagnetic wave and acoustic wave. The time at which the impulse occurs may be used to measure, map, and/or image subterranean features. If the repetition period of the series of impulses is Ts, the Fourier transform of the impulses in the frequency domain consists of impulses occurring at multiples of a base frequency ($f_0$) equal to $2n\pi/Ts$. If drill bit 402 provides pulses at a constant frequency, a range of corresponding discrete frequencies (e.g., $f_0$, $2f_0$, $3f_0$) are generated in the frequency domain. The discrete frequencies may be used to measure, map, and/or image subterranean features.

Electromagnetic waves 404 and/or acoustic waves 426 originate from and/or in proximity to drill bit 402 at the distal end of wellbore 424 and propagate outward. For example, electromagnetic waves 404 and/or acoustic waves 426 may propagate through one or more of subterranean layers 438, 436, and/or 434. Although FIG. 4 illustrates a formation having three layers, the subterranean region may include any number of layers and/or formations suitable for pulsed drilling. Electromagnetic waves 404 and/or acoustic waves 426 created at and/or in proximity to drill bit 402 may propagate from layer 438 to the surface 432 via layers 434 and/or 436. Although electromagnetic waves 404 and acoustic waves 426 are illustrated in FIG. 4 as propagating in certain directions, electromagnetic waves 404 and acoustic waves 426 may propagate in any direction.

Sensors 406, 410, and/or 414 may record responses to received signals including, but not limited to, high-energy electrical pulses, electrical arcs, or electromagnetic and/or acoustic waves. Each of the sensors may include an antenna. For example, sensors 406 and 410 may include linear dipole antennas and sensor 414 may include a loop antenna. Linear dipole antennas may be used to record responses to electric fields, including electric fields propagating from drill bit 402. Linear dipole antennas may be oriented in various directions to record responses to electric fields with varying polarizations, while loop antennas may be used to record responses to magnetic fields. For example, the linear dipole antenna in sensor 406 may be oriented parallel to the propagation of electromagnetic waves 404, while the linear dipole antenna in sensor 410 may be oriented perpendicular to the propagation of electromagnetic waves 404. Although three electromagnetic sensors are illustrated, measurement system 400 may include any number of sensors of any suitable type to record responses to an electric and/or magnetic field. The sensors may be oriented in any suitable direction to record responses to an electric and/or magnetic field with any polarization. For example, a sensor may include a coaxial or tilted coil antenna to record responses to electromagnetic data. As another example, the sensor may be a magnetometer for recording responses to the magnetic field. As a further example, the sensor may be an electric sensor, such as a sensor with a monopole antenna, dipole antenna, or pair of electrodes that are spaced apart. The sensor may be rotated around the centerline of a bottom hole assembly (BHA) of a wellbore, such as wellbore 424, to provide information about the formation at various azimuthal positions. Measurement system 400 may use more than one sensor simultaneously to provide polarization diversity with antennas oriented in different directions.

Sensors 406, 410 and/or 414 may convert the recorded responses into measurements and send the measurements to sensor analysis system 422. The measurements may be digital representations of the recorded responses. Sensor 406 may be communicatively coupled via interface 408 to sensor analysis system 422, sensor 410 may be communicatively coupled via interface 412 to sensor analysis system 422, and sensor 414 may be communicatively coupled via interface 416 to sensor analysis system 422. Each sensor may provide differential or single-ended measurement data to sensor analysis system 422 via an interface. For example, sensor 406 is illustrated with interface 408 having two sub-interfaces to transmit differential measurement data to sensor analysis system 422.

Sensor analysis system 422 may receive measurements from one or more of sensors 406, 410 and 414, and store the measurements as a function of pulse index and time or frequency. The pulse index may begin at one and be incremented each time a new pulse is generated at drill bit 402 during a pulsed drilling operation. The measurements may be represented in the time domain or the frequency domain. In the time-domain, sensors 406, 410 and 414 may measure electromagnetic waves by determining a voltage or current and may measure acoustic waves by determining a pressure or displacement. In the frequency domain, a sensor may measure the amplitude and phase by recording responses to the received signal, such as a steady state monochromatic signal, or by performing a Fourier transform of the signal, such as a wide band signal.

Acoustic waves 426 originate at or near drill bit 402 and propagate uphole along wellbore 424 to surface 432 during a pulsed drilling operation. Sensor 418 may be located proximate to surface 432 and may record responses to the acoustic wave to provide measurements to sensor analysis system 422 via interface 420 such that sensor analysis system 422 may calculate the time at which the electrical arc is formed. Each acoustic wave may travel uphole to the surface along the casing of wellbore 424 and drill string 440 at a known velocity. For example, the acoustic wave travels at a velocity of approximately 5000 m/s if the casing and drill string 440 are formed of steel. Other materials suitable for pulsed drilling with known acoustic propagation velocities may be used for the casing and drill string 440. For example, the acoustic propagation velocity is between 50 and 2000 m/s for rubber, on the order of 5000 m/s for titanium, and on the order of 4000 m/s for iron. The time of the formation of the electrical arc may be determined based on the known propagation velocity of the material used to form the casing and drill string 440 and the distance between surface 432 and drill bit 402. The distance between drill bit 402 and surface 432 may be determined by depth and position information generated by known downhole survey techniques for vertical drilling, directional drilling, multilateral drilling, and/or horizontal drilling.

Although FIG. 4 illustrates one acoustic sensor at the surface, any number of acoustic sensors suitable to measure, map, and/or image subterranean features may be positioned at one or more locations on the surface or elsewhere. For example, an array of acoustic sensors may be used within the wellbore. The acoustic sensors in the array may be positioned at different locations within the wellbore, and may be oriented in different directions to record responses to propagating acoustic waves. The array may provide information about the surrounding formation at various depths sufficient for sensor analysis system 422 to form a three-dimensional image of the surrounding subterranean features.

The equipment shown in FIG. 4 may be land-based or non-land based equipment or tools that incorporate teachings of the present disclosure. For example, some or all of the equipment may be located on offshore platforms, drill ships, semi-submersibles, or drilling barges (not expressly shown). Additionally, while the wellbore is shown as being a generally vertical wellbore, the wellbore may be any orientation including generally horizontal, multilateral, or directional.

Sensor analysis system 422 may process measurements received from sensors 406, 410, 414 and/or 418 to determine the distance and/or direction to a target wellbore based on responses recorded during a pulsed drilling operation. The distance and/or direction to another wellbore may be used to avoid, intercept, or maintain the direction of pulsed-power drilling operations. The distance may be determined by a sensor analysis system based on the measurements that are obtained. For example, the sensor analysis techniques described herein may be used to determine the distance to another wellbore based on the distance between two radially separated magnetometers (such as 1042 and 1044 in FIG. 10B) and the magnetic field measured by the magnetometers. In addition, the techniques may be used in an inversion as described for FIG. 6 to determine the proper distance to the second wellbore.

FIG. 5 is a block diagram illustrating an exemplary sensor analysis system associated with a pulsed-power drilling system. Sensor analysis system 500 may be positioned at the surface for use with pulsed-power drilling system 100 as illustrated in FIG. 1, or at any other suitable location. Sensor analysis system 500 may be configured to determine the range between wellbores including, but not limited to, the distance and/or direction to a wellbore.

In the illustrated embodiment, sensor analysis system 500 may include a processing unit 510 coupled to one or more input/output interfaces 520 and data storage 518 over an interconnect 516. Interconnect 516 may be implemented using any suitable computing system interconnect mechanism or protocol. Processing unit 510 may be configured to determine the distance between wellbores based, at least in part, on inputs received by input/output interfaces 520, some of which may include measurements representing responses recorded by various sensors within a wellbore, such as the recording of voltages, currents, ratios of voltages to current, or magnetic fields detected by one or more sensors. For example, processing unit 510 may be configured to perform one or more inversions to determine the distance and/or direction to a target wellbore based on measurements within a pulsed-power drilling wellbore or other wellbore.

Processing unit 510 may include processor 512 that is any system, device, or apparatus configured to interpret and/or execute program instructions and/or process data associated with sensor analysis system 500. Processor 512 may be, without limitation, a microprocessor, microcontroller, digital signal processor (DSP), application specific integrated circuit (ASIC), or any other digital or analog circuitry configured to interpret and/or execute program instructions and/or process data. In some embodiments, processor 512 may interpret and/or execute program instructions and/or process data stored in one or more computer-readable media 514 included in processing unit 510 to perform any of the methods described herein.

Computer-readable media 514 may be communicatively coupled to processor 512 and may include any system, device, or apparatus configured to retain program instructions and/or data for a period of time (e.g., computer-readable media). Computer-readable media 514 may include random access memory (RAM), read-only memory (ROM), solid state memory, electrically erasable programmable read-only memory (EEPROM), disk-based memory, a PCMCIA card, flash memory, magnetic storage, opto-magnetic storage, or any suitable selection and/or array of volatile or non-volatile memory that retains data after power to processing unit 510 is turned off. In accordance with some embodiments of the present disclosure, computer-readable media 514 may include instructions for determining one or more characteristics of a formation, such as formation 118 in FIG. 1, or the distance and/or direction to a target wellbore based on signals received from various sensors by input/output interfaces 520.

As described above, input/output interfaces 520 may be coupled to an optical fiber over which it may send and receive signals. Signals received by input/output interfaces 520 may include measurements representing responses recorded by various sensors at the surface or downhole during a pulsed drilling operation. For example, signals received by input/output interfaces 520 may include measurements representing responses recorded by electromagnetic, acoustic or electrical sensors. These measurements may include, without limitation, measurements of voltage, current, electric field strength, or magnetic field strength.

Data storage 518 may provide and/or store data and instructions used by processor 512 to perform any of the methods described herein for collecting and analyzing data from acoustic, electrical or electromagnetic sensors. In particular, data storage 518 may store data that may be loaded into computer-readable media 514 during operation of sensor analysis system 500. Data storage 518 may be implemented in any suitable manner, such as by functions, instructions, logic, or code, and may be stored in, for example, a relational database, file, application programming interface, library, shared library, record, data structure, service, software-as-service, or any other suitable mechanism. Data storage 518 may store and/or specify any suitable parameters that may be used to perform the described methods. For example, data storage 518 may provide information used to direct components of sensor analysis system 500 to analyze measurements representing responses recorded by various acoustic, electrical or electromagnetic sensors during a pulsed drilling operation to determine one or more characteristics of a formation, such as formation 118 as shown in FIG. 1, or the distance and/or direction to a target wellbore. Information stored in data storage 518 may also include one or more models generated or accessed by processing unit 510. For example, data storage 518 may store a statistical model for an electrical arc source or a model used in an inversion process, as described with respect FIG. 6.

The elements shown in FIG. 5 are exemplary only and sensor analysis system 500 may include fewer or additional elements in other embodiments, Modifications, additions, or omissions may be made to sensor analysis system 500 without departing from the scope of the present disclosure. For example, sensor analysis system 500 illustrates one particular configuration of components, but any suitable configuration of components may be used. Components of sensor analysis system 500 may be implemented either as physical or logical components. Furthermore, in some embodiments, functionality associated with components of sensor analysis system 500 may be implemented with special and/or general purpose circuits or components. Components of sensor analysis system 500 may also be implemented by computer program instructions.

Figure 6:
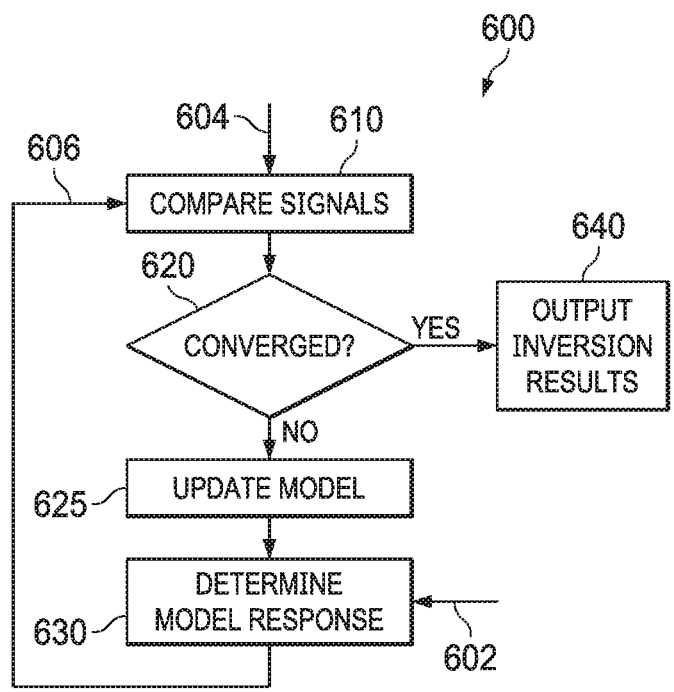
FIG. 6 is a flow chart illustrating an exemplary inversion process.

FIG. 6 is a flow chart illustrating an exemplary inversion process. In this example, inputs to inversion process 600 include model generation inputs 602, estimated signals 606, and received signals 604. Model generation inputs 602 may include initial estimates of the direction and/or distance to a target well based on a deterministic toroidal source model, as described with respect to FIG. 7. In addition, model generation inputs 602 may include initial estimates of an electric dipole source model at an arbitrary azimuth, as described in FIG. 10A. Model generation inputs 602 may be used to determine a model response, as shown in 630, including various model parameters and estimated signals 606. For example, the model response may include electrical and/or magnetic properties based on a toroidal source model and/or an electric dipole source model. Estimated signals 606 may include the estimated direction and/or estimated direction to a target well. Estimated signals 606 may be estimated with respect to the azimuth. Received signals 604 include any combination of unmodified measurements representing responses captured by various acoustic, electrical or electromagnetic sensors, and/or measurements derived from raw information recorded by the sensors, for example signals that have been normalized or otherwise modified as described herein. Received signals may indicate one or more measurements, such as a voltage, a current, ratio of a voltage to a current, or a magnetic field, of the electromagnetic waves created by a pulsed-power drilling operation. The measurement may represent a value in the time or frequency domain. In the frequency domain, for example, absolute values of received signals 604 may be used at discrete frequencies. As another example, the ratios of received signals 604 at different frequencies may be used in the inversion. The ratio of received signals 604 may reduce or filter out any undesirable factor in received signals 604, such as the borehole effect or amplitude and/or phase fluctuations in the excitation of the electric pulse or electric arc. The inversion may consider the ratio of received signals 604 at different frequencies to be one received signal at one frequency.

As shown at 610, received signals 604 may be compared with estimated signals 606 to determine whether there is a mismatch between received signals 604 and estimated signals 606. If at 620 there is a mismatch between the signals, rather than a convergence, the model parameters may be updated, as shown in 625, and an updated model response may be determined, as shown in 630. When and if there is convergence between received signals 604 and estimated signals 606, the results of the inversion process may be output, as shown in 640. For example, if a match is found between a model response for the electrical and/or magnetic properties associated with an electric dipole source model or toroidal source model and received signals 604, the distance and/or direction to the target well may be output as the result of the inversion process.

Figure 7:
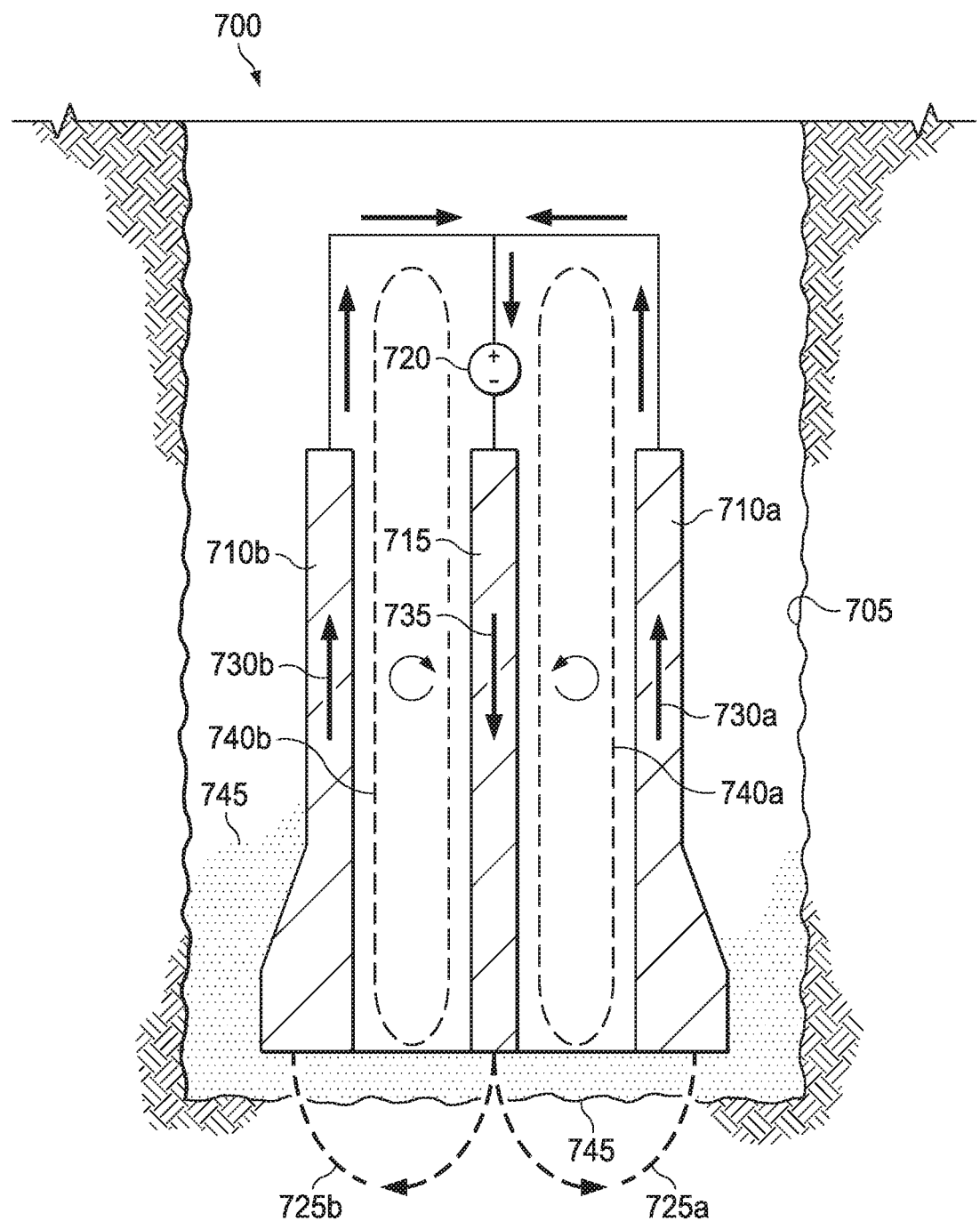
FIG. 7 is a block diagram illustrating an exemplary model for a source of electrical arcs.

FIG. 7 is a block diagram illustrating an exemplary model for a source of electrical arcs. The model may be used in an inversion, as described with respect to FIG. 6. In the pulsed-power drilling systems described herein, electrical arcs do not have rotational symmetry around a centerline of the bottom-hole assembly (BHA) and individual electric arcs may occur at random azimuthal locations between electrodes of a drill bit. A toroidal source model may be used to statistically estimate the excitation of the electrical arcs. More specifically, the toroidal source model may be used to generate a time-averaged signal that is the same as the measurements representing responses recorded by the electrical or electromagnetic sensors. The receiving sensors may record responses to received signals including, but not limited to high-energy electrical pulses, electrical arcs, or electromagnetic waves produced by the electrical arcs. The receiving sensors or arrays of such sensors may perform statistical averaging by recording responses to the received signals over a certain period of time. For example, hundreds of excitation pulses may be averaged at the receiving sensor. A moving average may be performed in real time, since recording all signals and averaging them in post-processing may be cost or space prohibitive in the BHA environment.

An equivalent excitation of the electrical arcs that generates the same signal as a time-averaged signal generated at the receiving sensors, modeled as a toroidal pulse source model 700, is illustrated in FIG. 7. In the example embodiment illustrated in FIG. 7, it is assumed that individual electrical arcs may form at random locations on the pulsed-power drill bit. For example, electrical arcs may form between electrodes 208 and 210 as illustrated in FIG. 2A or between electrode 212 and ground ring 250 as illustrated in FIG. 2B. Many such arcs may occur consecutively in time, with a frequency and intensity determined by the pulse scheme used for the drilling operation. The surrounding formation and the receiving sensors may behave linearly with the electrical arc excitation and the locations of the arcs and their random amplitude fluctuations may be time-averaged at the receiving sensors to arrive at the equivalent toroidal pulse source model 700.

Model 700, which may be referred to as an equivalent deterministic source model, includes voltage source 720, and one or more electrodes as shown in FIGS. 2A and 2B. The voltage source may provide charge 750 on the end of electrodes 715, 740a, and 740b via high-energy electrical pulses. In this equivalent deterministic source model, constant-amplitude pulsed currents 735 flow downhole uniformly over the center electrode 715, pass through the formation and; or drilling fluid 745 along a semi-toroidal surface represented by currents 725a and 725b, and flow uphole uniformly along the outer wall of the drill bit at 710a and 710b as currents 730a and 730b. The two opposite paths of the current flow are indicated by dashed loops 740a and 740b shown in the annular region between the center electrode 715 and the outer wall represented by 710a and 710b. In this equivalent deterministic source model, both the BHA and the current paths have rotational symmetry around the BHA axis. The toroidal source may behave like an electric dipole oriented parallel to the BHA.

Figure 8B:
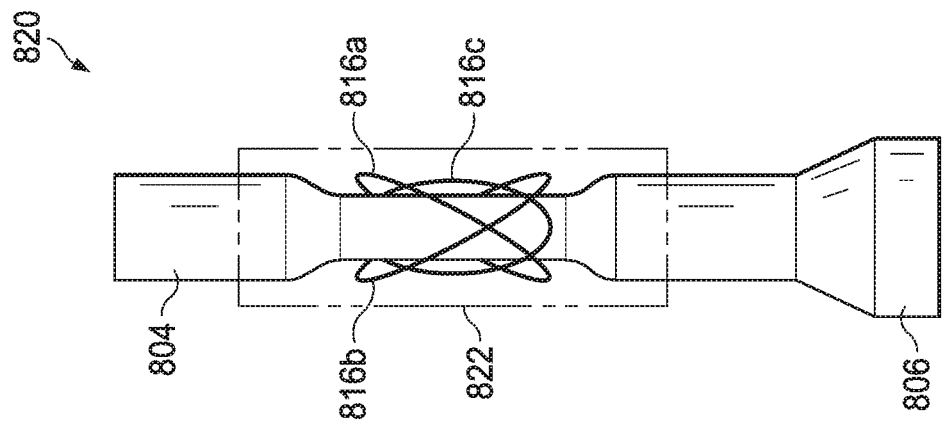
FIG. 8B is an elevation view of exemplary components of a measurement system including multiple antennas that are associated with the bottom hole assembly (BHA) of the pulsed-power drilling system.
Figure 8A:
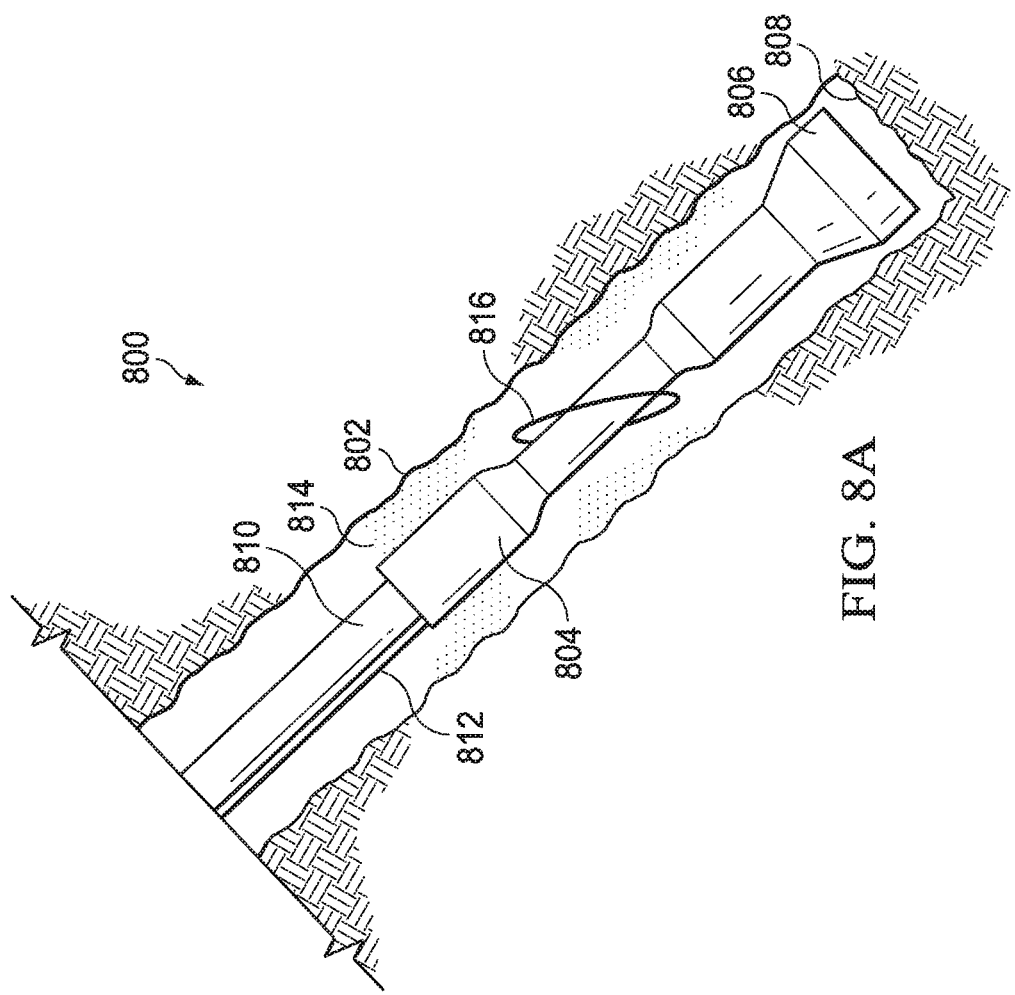
FIG. 8A is an elevation view of exemplary components of a measurement system including a single antenna that is associated with the bottom hole assembly (BHA) of the pulsed-power drilling system.

FIG. 8A is an elevation view of exemplary components of a drilling system including a sensor associated with the bottom-hole assembly (BHA) of the drilling system. Drilling system 800 may include pulsed-power drill bit 806, bottom-hole assembly (BHA) 804, and drill string 810. Drill bit 806 may receive power via cable 812 to provide high-energy electrical pulses to the electrodes (not expressly shown) of drill bit 806. The high-energy electrical pulses create electrical arcs through formation 808 surrounding wellbore 802. The electrical arcs fracture rock in formation 808, which is carried away by drilling fluid 814. In addition to causing the rock to fracture, the electrical arcs generate electromagnetic waves that may be measured by sensor 816. Sensor 816 may be communicatively coupled to a sensor analysis system, such as sensor analysis system 150 in FIG. 1, sensor analysis system 422 in FIG. 4, or sensor analysis system 500 in FIG. 5. Power may be delivered to sensor 816 by, for example, cable 812. As another example, sensor 816 may be powered by a battery (not expressly shown). As a further example, sensor 816 may receive power by a laser (not expressly shown) through an optical fiber deployed downhole, such as optical fiber 160 in FIG. 1. A conversion unit, such as a photovoltaic cell, within bottom-hole assembly 804 may convert light from the laser into electrical energy to power sensor 816.

Sensor 816 may include an antenna that is tilted as shown or that is coaxially oriented. Sensor 816 may receive a signal representing the electromagnetic wave created during a pulsed drilling operation and record responses at a particular orientation. The antenna of sensor 816 may be rotated along the centerline of BHA 804 in order for sensor 816 to record responses at different orientations. For example, the antenna in sensor 816 may be rotated to different azimuthal positions of approximately 0, 90, 180, and 270 degrees. Any number of responses at different azimuthal positions may be recorded to generate two-dimensional information about the surrounding formation including, but not limited to, the location of other wellbores. The antenna of sensor 816 may be rotated in any suitable manner for taking measurements. For example, if sensor 816 includes a tilted coil, the tilted coil may be rotated by rotating BHA 804 using drill string 810. Although the rotation of BHA 804 may increase interference with recorded responses of low-frequency electromagnetic waves, such as electromagnetic waves having a frequency of approximately 100 Hz and below, the exemplary tilted coil may be azimuthally sensitive to electromagnetic waves having a frequency above approximately 100 Hz. As another example, a motor located proximate the antenna of sensor 816 may rotate the antenna at a rate independent of the rate at which BHA 804 may or may not rotate during a pulsed-power drilling operation. Sensor 816 may record responses to the electromagnetic waves and send measurements to a sensor analysis system to determine information about the surrounding formation, such as the resistivity of the formation, dielectric constant of the formation, magnetic permeability of the formation, resistivity anisotropy of the formation, layer positions, density of the formation, compressional velocity of the formation, shear velocity of the formation, or the bed boundaries around and ahead of drill bit 806. Responses recorded by sensor 816 can also be used in ranging calculations to determine one or more parameters of a nearby wellbore, including but not limited to the distance, direction, and orientation as described in detail herein.

FIG. 8B is an elevation view of exemplary components of a drilling system including multiple sensors associated with the bottom-hole assembly (BHA) of the drilling system. Drilling system 820 may include pulsed-power drill bit 806, bottom-hole assembly (BHA) 804, and drill string 810. Similar to drilling system 800 in FIG. 8A, high-energy electrical pulses may be provided to the electrodes (not expressly shown) of drill bit 806 to create electrical arcs through the formation 808 surrounding the wellbore (not expressly shown). The electrical arcs fracture rock in the formation and generate electromagnetic and/or acoustic weaves that may be measured by sensor assembly 822. Sensor assembly 822 may be communicatively coupled to a sensor analysis system, such as sensor analysis system 422 in FIG. 4. For example, sensors 816a, 816b, and 816c may be housed within one or more sensor assemblies. Each sensor may include an antenna, such as a tilted coil as shown. The antennas within sensor assembly 822 may be of the same or different types. The antennas of sensors 816a, 816b, and 816c may be oriented with different azimuthal directions to allow for azimuthal sensitivity to the electromagnetic waves emitted during a pulsed-power drilling operation. Responses may be recorded by each of the sensors, which may convert the responses into measurements that are sent to a sensor analysis system. Measurements representing these responses may subsequently be used by the sensor analysis system in ranging calculations to determine a parameter associated with a nearby wellbore, including but not limited to the distance, direction, and orientation.

FIG. 8C is an elevation view of exemplary components of a drilling system including multiple magnetometers associated with a bottom-hole assembly (BHA) of the drilling system. Drilling system 830 may include a pulsed-power drill bit (not expressly shown), a bottom-hole assembly (BHA) 804, and drill string 812. Similar to drilling system 800 in FIG. 8A, high-energy electrical pulses may be provided to the electrodes the drill bit to create electrical arcs through the formation 808 surrounding the wellbore (not expressly shown). The electrical arcs fracture rock in the formation and generate electromagnetic and/or acoustic waves that may be measured by magnetometers 832. A sensor subassembly 822 may house magnetometers 832 as shown. Magnetometers 832 may be any suitable type that measures a magnetic field. For example, the magnetometers may be flux gate magnetometers and/or rotating magnetometers that may measure a low-frequency magnetic field, such as the magnetic field corresponding to the electromagnetic waves created by the pulsed-power drill bit during a pulsed-power drilling operation. Magnetometers 832 may be individually placed at different positions around the perimeter of sensor assembly 822 or bottom-hole assembly (BHA) 804. For example, magnetometers 816a, 816b, and 816c may be placed at different azimuthal locations to measure the magnetic field in different directions to provide two-dimensional information about the surrounding formation based on the propagation of electromagnetic waves from the pulsed-power drill bit. As another example, magnetometers 832 may be x-y magnetometers. Responses of magnetometers 832 may be used in ranging calculations to determine one or more parameters associated with a nearby wellbore, including but not limited to the distance, direction, and orientation. Magnetometers 832 may be co-located with one or more accelerometers (not expressly shown) to compensate for the direction of the wellbore relative to a gravitational reference, such as the magnetic north of the Earth's magnetic field.

FIG. 9A illustrates a bottom up view of exemplary components of a pulsed-power drill bit with an associated sensor analysis system. Drill bit 900 may include one or more center electrodes, such as center electrode 922, and one or more outer electrodes, such as a plurality of electrodes disposed proximate outer wall 904. For example, the electrodes of drill bit 900 may have a configuration as shown in FIGS. 2A and/or 2B. Electrical arcs 906 may form during pulsed-power drilling operations between center electrode 922 and the electrodes proximate outer wall 904.

Electrical arcs 906 may be detected by sensors 908 that are azimuthally distributed along outer wall 904. Responses may be recorded by each of the sensors 908. Sensors 908 may be magnetometers, buttons, current-meters, or any sensor suitable for detecting, measuring, and/or recording responses corresponding to electrical arcs 906. Measurements representing these responses may be used to determine an excitation direction in terms of an azimuth angle, such as azimuthal angle 910. For example, measurements representing raw recorded responses and/or modified measurements may be inputs to an inversion process, as described with respect to FIG. 6.

FIG. 9B is a graph illustrating bins for measurements from multiple sensors azimuthally distributed around a centerline of the bottom-hole assembly (BHA) of the pulsed-power drilling system. Responses from the azimuth sensors, such as sensors 908 in FIG. 9A, may be organized into a series of bins that correspond to the azimuthal location or angle ($\phi_{src}$) of the electrical arcs. For example, each of the azimuth sensors may be placed at different azimuthal locations. Each sensor may provide one or more measurements corresponding to an electrical arc to a sensor analysis system, such as sensor analysis system 422 in FIG. 4 or sensor analysis system 500 in FIG. 5. For example, the sensor analysis system may compare measurements between the sensors to determine the measurement with the highest amplitude. The azimuthal direction for an electrical arc may be determined based on the azimuthal location of the sensor with the highest amplitude measurement. As another example, the azimuthal direction for an electrical arc may be determined based an average azimuthal direction. The sensor analysis system may average the measurements between adjacent sensors and then compare the measurements between the averaged values to determine the measurements with the highest average amplitude. The azimuthal direction for an electrical arc may be determined based on the average azimuthal location between two adjacent sensors with the highest average amplitude measurement. The measurements by the sensors may also be evaluated over many electrical arcs during pulsed-power drilling operations. The sensor analysis system may determine the azimuthal direction for an electrical arc and increment the count of a counter corresponding to the azimuthal direction. Over many electrical arcs, counters corresponding to different azimuthal directions may be incremented.

In the graph shown in FIG. 9B, the horizontal axis represents the azimuthal location ($\phi_{src}$) and the vertical axis represents the number of electrical arcs binned at a particular azimuthal location. Each line in the graph represents a counter corresponding to an azimuthal direction. For example, line 946 represents a counter corresponding to an azimuthal direction of 30 degrees and line 944 represents a counter corresponding to an azimuthal direction of 270 degrees. Although the lines are shown representing counters corresponding to azimuthal directions 60 degrees apart (e.g., 30 degrees, 90 degrees, 150 degrees, etc.), any number of counters may be used.

Although the graph shows bins that correspond to the azimuthal location of the electrical arcs ($\phi_{src}$), the sensor analysis system may make determinations regarding pulsed-power drilling operations based on bins that correspond to the azimuthal location of the received responses ($\phi_{rev}$) as determined from measurements by one or more sensors located uphole from the drill bit, such as sensors 816a, 816b, and 816c that are shown oriented with different azimuthal directions in FIG. 8B or sensor 816 as shown in FIG. 8A. Though the graph shows measurements organized into a series of bins, measurements from sensors may be organized into a two-dimensional array of bins, in which one dimension corresponds to the azimuthal direction of the electrical arcs ($\phi_{src}$) measured by the azimuth sensors and the other dimension corresponds to the azimuthal direction of the received responses ($\phi_{rev}$) as determined from measurements by one or more sensors.

As shown in FIG. 9B, the sensor analysis system may organize measurements into a series of bins, in which each bin corresponds to an azimuthal direction and contains a counter representing the number of electric arcs formed in the azimuthal direction of the bin. The sensor analysis system may make determinations regarding a pulsed drilling operation based on the azimuthal direction associated with the counter having the greatest number of counts. Responses recorded by azimuthally distributed sensors may be used in estimating the values of formation parameters around the drill bit, or in ranging calculations to determine one or more parameters associated with a nearby wellbore, including but not limited to the distance, direction, and orientation. These formation parameters may represent electrical and/or acoustic properties of the formation. For example, electrical parameters that may be estimated based on responses recorded by azimuthally distributed sensors include electrical conductivity σ, permeability c, and electrical resistivity, which is inverse of electrical conductivity. Acoustic parameters that may be estimated based on responses recorded by the azimuthally distributed sensors include density d, shear velocity Vs, compressed velocity Vc, and Young's modulus.

The sensor analysis system may also be configured to estimate a parameter of interest along the azimuthal direction at a particular azimuthal angle φ. Variations in the value of the parameter of interest at different azimuthal angles φ may indicate differences in the characteristics of a formation in different directions relative to the drill bit, which may be used to direct or modify a pulsed drilling operation. For example, the sensor analysis system may be configured to determine a more efficient drilling strategy or drilling direction based on differences in the electrical resistivity of the formation in different directions relative to the drill bit.

Figure 10A:
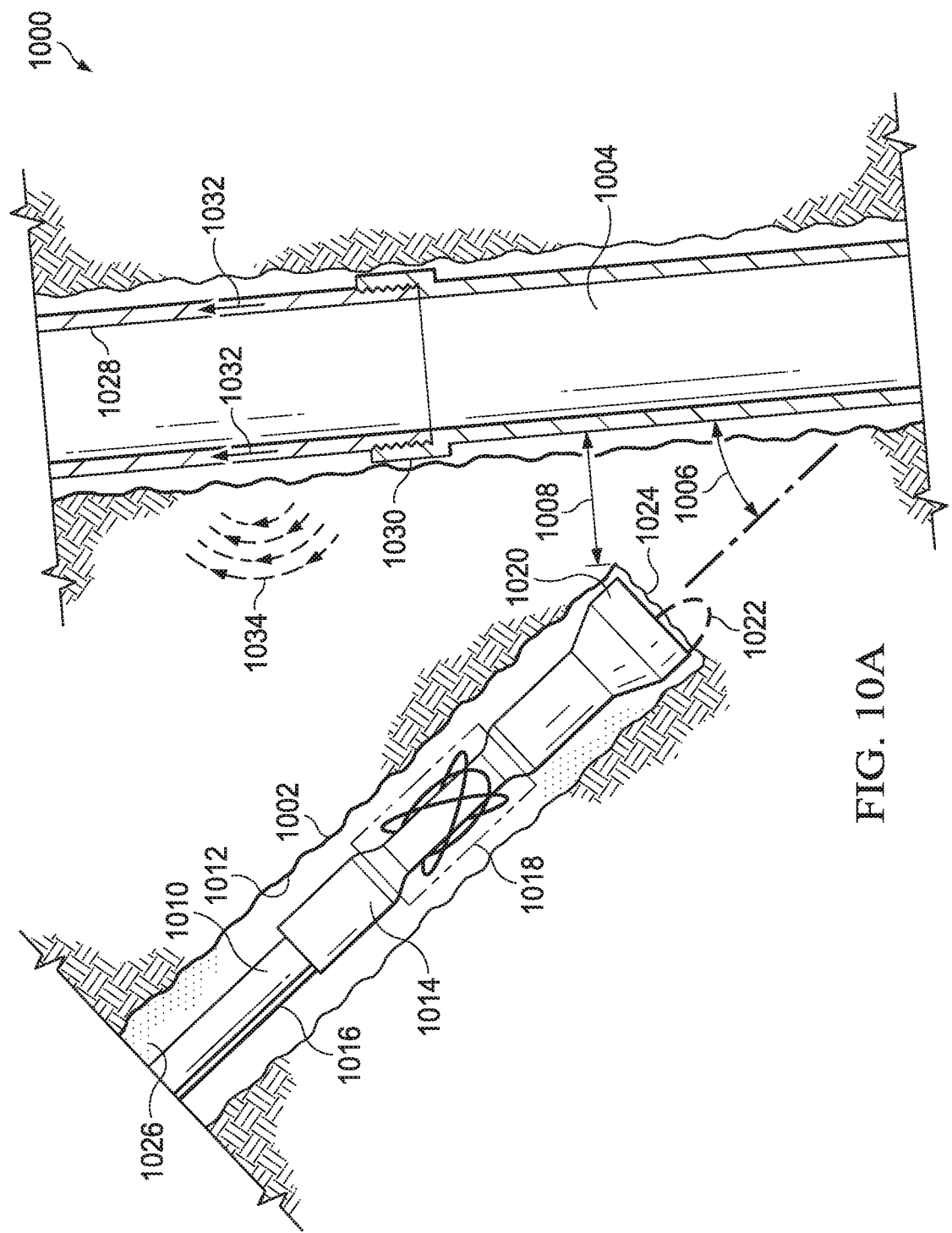
FIG. 10A is a cross sectional view of exemplary components of a bottom hole assembly (BHA) for a ranging system.

FIG. 10A is a cross sectional view of exemplary components of a bottom hole assembly (BHA) for a ranging system. Pulsed-power drilling system 1000 may include a pulsed-power drilling wellbore 1002 and target wellbore 1004. Drilling wellbore 1002 may avoid, intersect, or maintain a distance from target wellbore 1004. A drilling system may be located in drilling wellbore 1002 within the walls of the borehole 1012. The drilling system may include a drill bit 1020, bottom-hole assembly 1014, and drill string 1010. Electricity may be provided to drill bit 1020 by power 1016. A ranging system may include a sensor assembly 1018, such as sensor assembly 822 in FIGS. 8B and/or 8C, and a sensor analysis system (not expressly shown). Sensor assembly 1018 may be coupled to bottom-hole assembly (BHA) 1014 of the drilling system. Sensors in assembly 1018 may record responses to electromagnetic fields and/or electromagnetic waves created by the pulsed-power drilling system. Sensor assembly 1018 may include one or more sensors, such as sensor 816 in FIG. 8A and/or sensors 816a, 816b, and 816c in FIGS. 8B and/or 8C. For example, the tilted coil antennas of the sensors may be oriented in different azimuthal positions as shown in FIG. 10A. During a pulsed-power drilling operation, drilling fluid 1026 may be transferred uphole to the surface to carry away fractured rock from drill bit 1020. Although two wells are shown sensor assembly 1018 may be placed within a third wellbore to measure the electromagnetic fields and/or electromagnetic waves induced by drill bit 1020.

During a pulsed-power drilling operation, electric arc 1022 may form between electrodes (not expressly shown) on drill bit 1020. For example, the arc may form through a portion of the rock 1024 in the surrounding layer of the formation proximate the distal end of drill bit 1020, which may cause a primary azimuthal magnetic field to form. Drilling wellbore 1002 may be oriented at an angle (θ) 1006 relative to target wellbore 1004. As described below, angle (θ) 1006 between the two wellbores may be increased or decreased such that drilling wellbore 1002 may avoid, intersect, or maintain a distance from target wellbore 1004. In addition, drilling wellbore 1002 may be a distance (d) from target wellbore 1004. Target wellbore 1004 may include casing 1028 and collar 1030. Casing 1028 may be metallic and may carry an axial target current 1032, which may be caused by electric arc 1022. Target current 1032 may travel uphole along casing 1028 and may create a secondary azimuthal magnetic field 1034.

Secondary magnetic field 1034 may propagate from target wellbore 1004 toward drilling wellbore 1002. One or more sensors within sensor assembly 1018 may be used to measure secondary magnetic field 1034, such as the sensors shown in FIGS. 8A-C. As explained for FIG. 4, drill bit 1020 can generate a range of discrete frequencies in the frequency domain. Accordingly, an electric arc generated by drill bit 1020 may create secondary magnetic field 1034 with broad frequency content including, but not limited to, low-frequency magnetic fields and high-frequency magnetic fields.

The direction represented by angle 1006 and distance 1008 to target wellbore 1004 may be determined based on measurements sent from one or more sensors to a sensor analysis system. For example, the sensor analysis system may average electrical arcs and model the arcs as a toroidal source model, as explained for FIG. 7, to determine the direction and/or distance between drilling wellbore 1002 and target wellbore 1004. A toroidal source model may be represented by an axial electric dipole. For the electric arc to generate secondary magnetic field 1034 suitable to be received and recorded by sensors in sensor assembly 1018, a sufficient target current 1032 may be generated by orienting drilling wellbore 1002 at an angle of less than approximately 85 degrees (θ) relative to target wellbore 1004. The direction ($\varphi_{src}$) of electric arcs 1022 generated by the drilling system in drilling wellbore 1002 may be determined by using azimuth sensors, as described in FIGS. 9A-B. A sensor analysis system may use the direction of electric arcs 1022 to determine a direction of target wellbore 1004. Measurements associated with the electromagnetic waves that are received and recorded as responses by the sensors may be used in an inversion, such as inversion process 600 in FIG. 6, to determine the distance and/or direction from drilling wellbore 1002 to target wellbore 1004. For example, the azimuthal direction may be based on the measurement as described for FIGS. 9A-B.

Figure 10B:
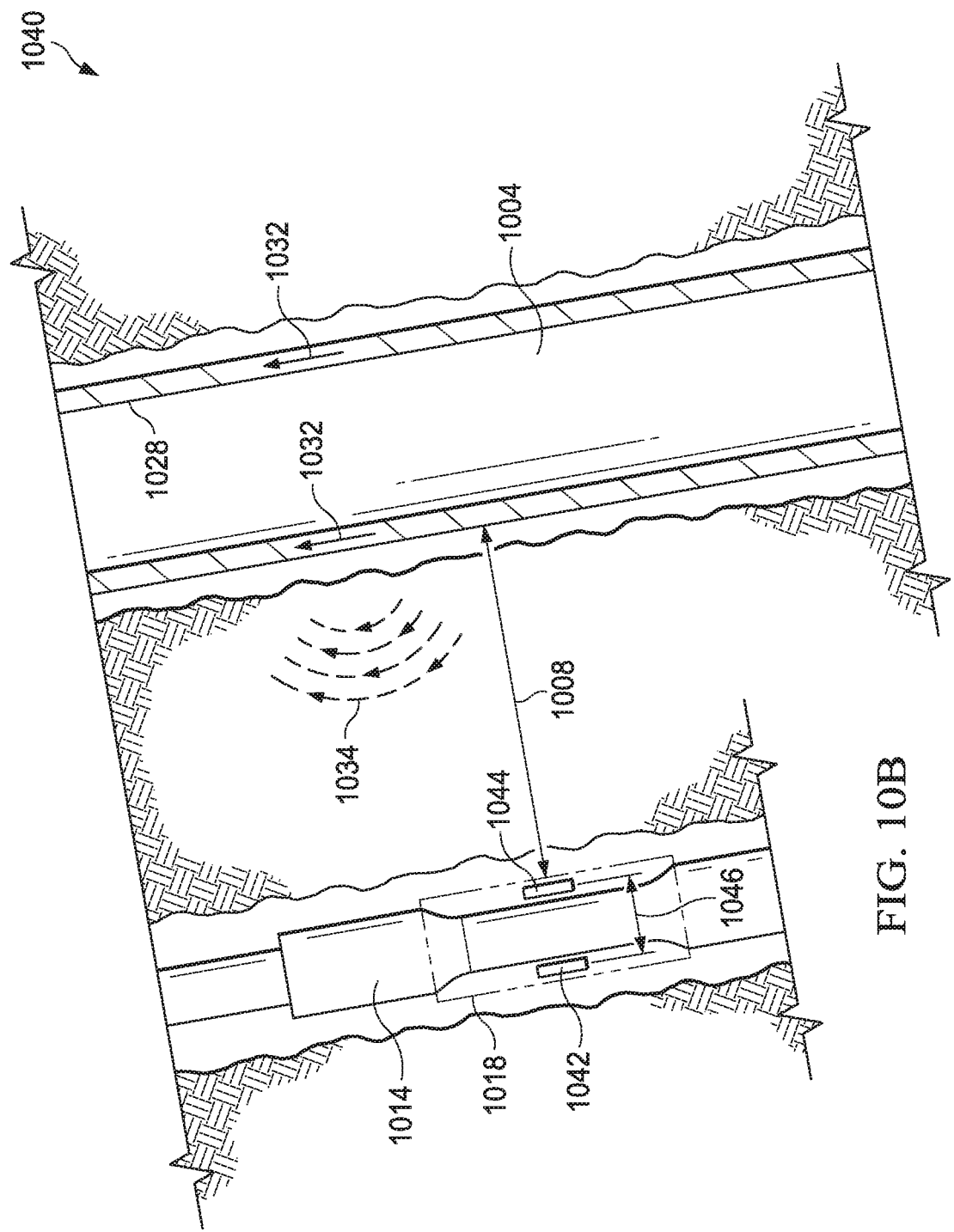
FIG. 10B is a cross sectional view of exemplary components of a bottom hole assembly (BHA) for a gradient ranging measurement system.

FIG. 10B is a cross sectional view of exemplary components of a gradient ranging system. Pulsed-power drilling system 1040 may include similar components as drilling system 1000. A gradient ranging system may include sensor assembly 1018 with two magnetometers 1042 and 1044 radially separated by a known distance 1046. Magnetometers 1042 and 1044 may measure the gradient of secondary magnetic field 1034 to determine distance 1008 to target well 1004. Although two magnetometers are shown, any number of magnetometers spaced apart by a known distance may be used.

If target current 1032 is constant, the secondary magnetic field 1034 may be determined by the following equation:

$$\vec{H}^i(\vec{r}) = \frac{I_t}{2\pi d}\hat{\phi} \quad (1)$$

In equation (1), $\vec{H}^i(\vec{r})$ is the is the magnetic field at a point $\vec{r}$, $I_t$ is target current 1032, d is the radial distance from target well 1004 to point $\vec{r}$, and $\hat{\phi}$ is the angle between the point and target well 1004. At the same point, the gradient of the secondary magnetic field 1034 may be defined by the following equation:

$$\frac{\partial \vec{H}^i(\vec{r})}{\partial d} \approx -\frac{I_t}{2\pi d^2}\hat{\phi} \quad (2)$$

Radial distance 1008 to target well 1004, d, may be determined by taking the ratio of $\vec{H}^i(\vec{r})$ to $$\frac{\partial \vec{H}^i(\vec{r})}{\partial d}$$

as follows:

$$d = \left| \frac{\vec{H}^i(\vec{r})}{\frac{\partial \vec{H}^i(\vec{r})}{\partial d}} \right| \quad (3)$$

Target current 1032 induced in target well 1004 may be assumed to be uniform if the sensors are close to target well 1004 and the distance between the sensors 1046 is small relative to the distance 1008 to target well 1004. The gradient of magnetic field 1034, $$\frac{\partial \vec{H}^i(\vec{r})}{\partial d},$$

may be approximated as $$\frac{\vec{H}_2^i - \vec{H}_1^i}{\delta}$$

in which $\vec{H}_2^i$ and $\vec{H}_1^i$ are the magnetic fields in the radially-separated magnetometers and $\delta$ is the distance (1046) between them. Thus, the distance 1008 to target well 1004 may be determined based on the magnetic field 1034 at a point $\vec{r}$ ($\vec{H}^i(\vec{r})$), the difference between the magnetic fields measured by the radially-separated magnetometers ($\vec{H}_2^i - \vec{H}_1^i$), the distance 1046 between the radially-separated magnetometers ($\delta$).

Figure 10C:
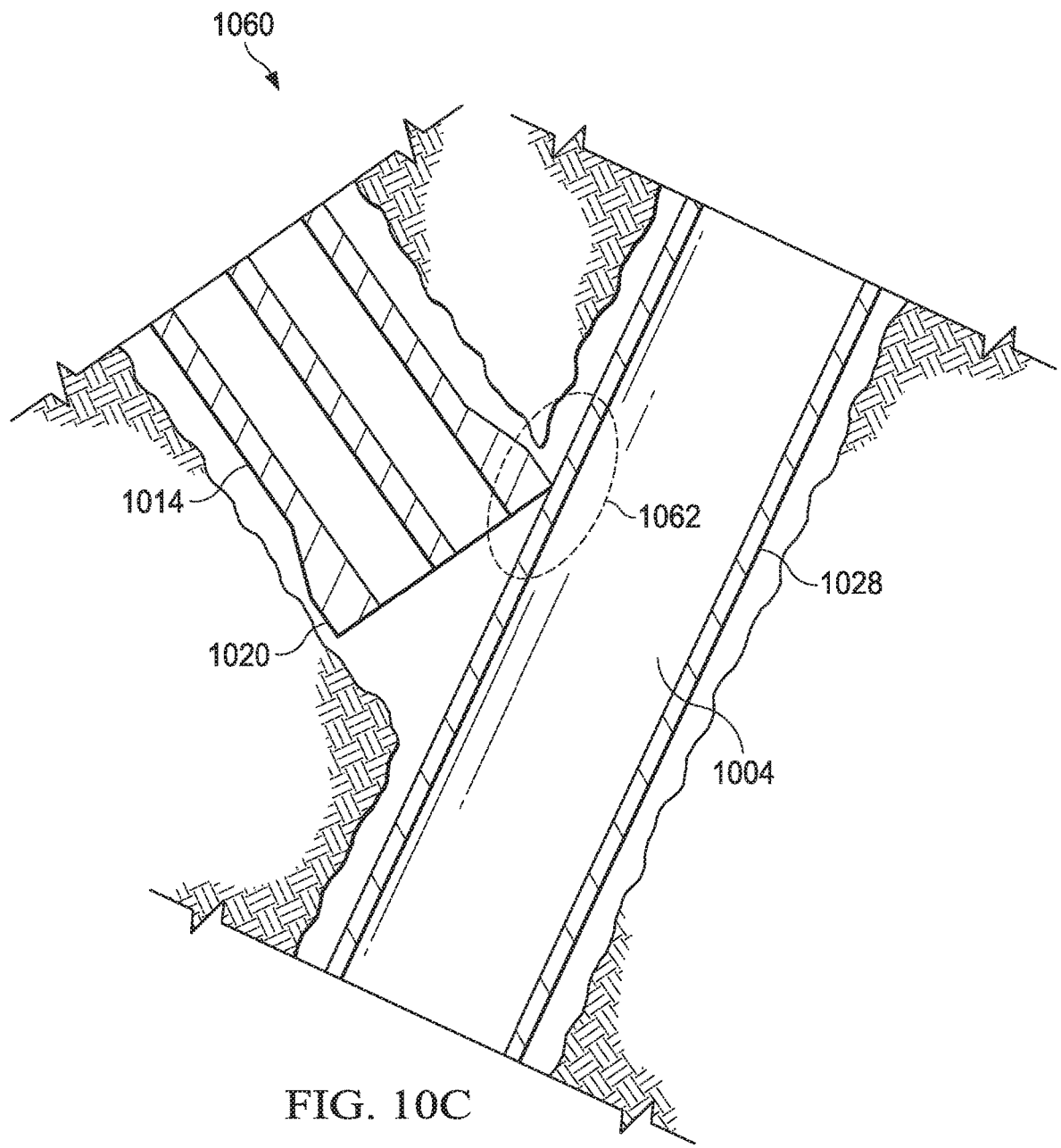
FIG. 10C is a cross sectional view of exemplary components of a bottom hole assembly (BHA) for an intercept ranging measurement system.

FIG. 10C is a cross sectional view of exemplary components of an intercept ranging system. Pulsed-power drilling system 1060 may include similar components as drilling system 1000. An intercept ranging system may include one or more sensors (not expressly shown) to record responses as a voltage, current, and/or resistance and a sensor analysis system to determine whether drilling system 1060 has intercepted target well 1004. Target well 1004 may include casing 1028 that may be electrically conductive. When pulsed-power drill bit 1020 advances down the drilling wellbore, it may come in contact with casing 1028 of target well 1004. Because casing 1028 may be electrically conductive, pulsed-power drill bit 1020 may cause an electrical short 1062 with casing 1028 upon contact or when drill bit 1120 is in the vicinity of casing 1028. Electrical short 1062 may be detected by one or more sensors located within bottom-hole assembly (BRA) 1014 or on the surface. Detection of electrical short 1062 may include checking for a sudden drop in the input impedance to drill bit 1020, a sudden increase in input current to drill bit 1020, or a sudden decrease in input voltage to drill bit 1020. For example, the input current and voltage may be checked. If the voltage remains the same but the current suddenly increases beyond a threshold, electrical short 1062 may be detected. In a similar manner, if the current remains the same but the voltage suddenly decreases beyond a threshold, electrical short 1062 may be detected. As another example, the input impedance may be determined based on the voltage and/or current. The determined input impedance, or change in input impedance may be compared to a threshold. If the value is below the threshold, electrical short 1062 may be detected. In response to the detection of the electrical short, a pulsed-power drilling operation may be modified. For example, the drill string may be pulled out of the wellbore and pulsed-power drill bit 1020 may be replaced with a non-pulsed-power drill bit. As another example, pulsed-power drill bit 1020 may be begin rotation or increase the rate of rotation in order to breach the casing 1028 of target well 1004.

Figure 11:
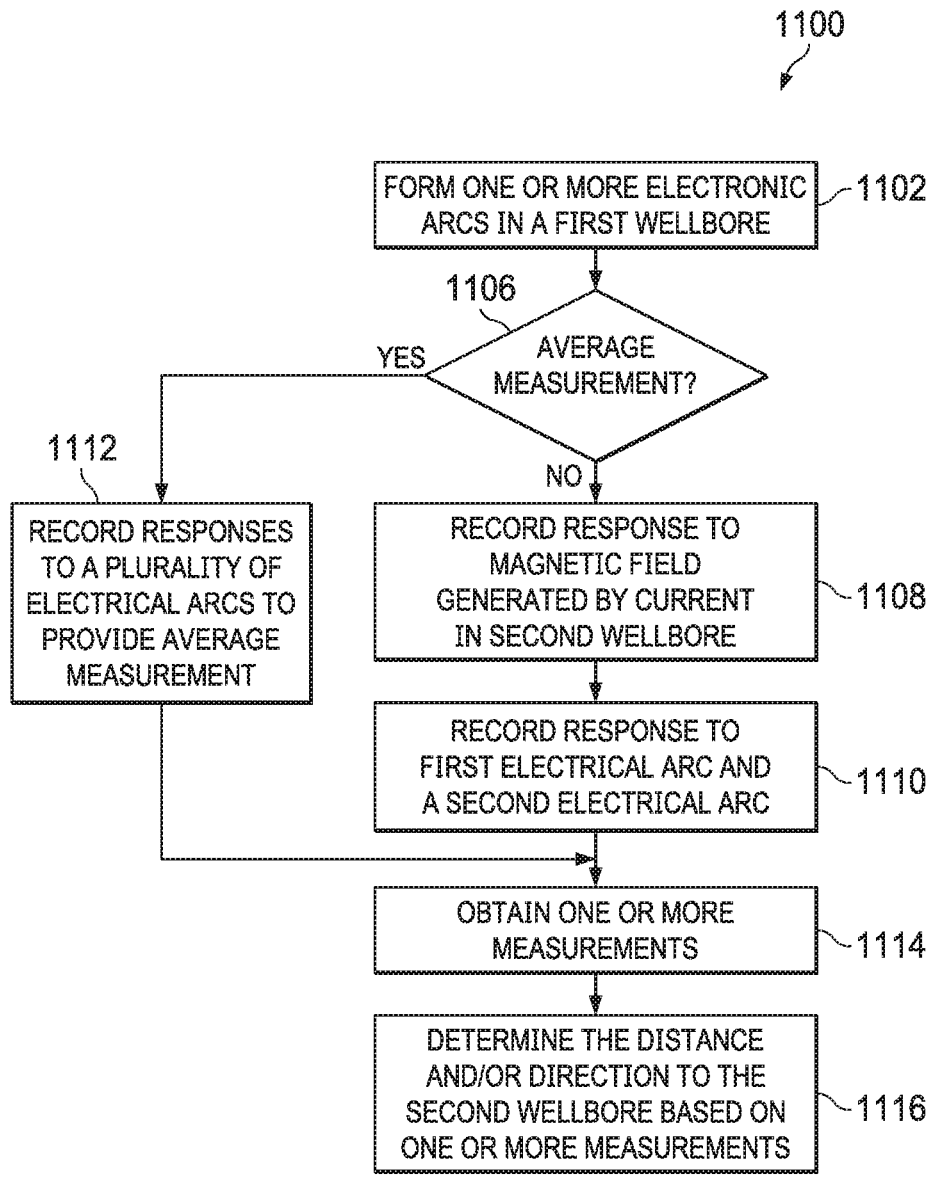
FIG. 11 is a flow chart of exemplary method for determining the range between wellbores.

FIG. 11 is a flow chart of exemplary method for determining the range between wellbores. Method 1100 may begin if a first wellbore is to avoid or maintain a distance from a second wellbore. Method 1100 may begin and at 1102 one or more electrical arcs may be formed at the pulsed-power drill bit in a first wellbore. The electrical arcs may be formed between a first electrode and a second electrode of the drill bit. For example, the electrical arcs may form between electrode 208 and ground ring 250 in FIG. 2A, as shown by currents 725a and 725b in FIG. 7.

At 1106, it may be determined whether to record responses for an average measurement. If responses for an average measurement are to be recorded, method 1100 may proceed to 1112. An average measurement may be generated by a sensor in real-time to reduce the number of measurements sent to a sensor analysis system. Otherwise if responses for an average measurement are not to be recorded, method 1100 may proceed to 1108.

At 1108, one or more sensors may record a response to a secondary magnetic field generated by a current in a second wellbore. Electrical arcs in the first wellbore create a primary magnetic field that induces the current in the second wellbore. For example, secondary magnetic field 1034 in FIG. 10A may be generated by target current 1032 in target well 1004. The responses may be recorded in the time-domain or frequency-domain as described in FIGS. 4 and 10A. The sensors may convert the recorded responses into one or more measurements and send the measurements to a sensor analysis system. The measurements may be a voltage, current, ratio of voltage to current, or magnetic field. The sensors may be located in the first wellbore or in a third wellbore such that the sensors can record responses to the secondary magnetic field. The sensors may include one sensor 816 as shown in FIG. 8A or a plurality of sensors in a sensor assembly 822 as shown in FIG. 8B. The sensors may include coaxial coils, tilted coils, magnetometers, linear dipole antennas, and/or loop antennas as described in FIGS. 4 and 8A-C. The sensors may be powered by power cable 812 in FIG. 8A, a battery, or a charged fiber optic cable as described in FIG. 8A. If the sensor is located in the first wellbore, the first wellbore may be less than approximately 85 degrees from the second wellbore in order for the sensor to record responses to the secondary magnetic field.

At 1110, one or more sensors may record responses to a first electrical arc and a second electrical arc. The sensors may be any of the sensors described with respect to 1108 or azimuth sensors 908 in FIG. 9A. The sensor may convert the response into a measurement, such as the measurements described in 1108.

At 1112, one or more sensors may record responses and convert them into an average measurement associated with the electrical arcs. The sensors described in 1110 may be used to record multiple responses over time to obtain an average measurement. For example, the recorded response to the first electrical arc and the second electrical arc may be averaged together to obtain an average measurement.

At 1114, one or more measurements (such as those in 1108, 1110, 1112 and 1118) may be obtained by a sensor analysis system, such as sensor analysis system 500 in FIG. 5.

At 1116, the distance and/or direction to the second wellbore may be determined based on the measurements obtained in 1114. For example, distance 1008 may be determined as described in FIGS. 10A-C. The distance may be determined based on the distance between two radially separated magnetometers (such as 1042 and 1044 in FIG. 10B) and the magnetic field received and recorded by the magnetometers. The measurement may be a ratio of measurements at different frequencies, such as the ratio of the measurement at a first frequency to the measurement at a second frequency. The ratio may filter or reduce the effects of undesirable information that is common to measurements at both the first and second frequency. In addition, the measurements may be used as received signals in an inversion as described for FIG. 6. For example, the inversion may compare the received signals to expected signals based on a model to determine the proper distance to the second wellbore.

As another example, the direction to the second wellbore may be determined, such as direction 1006 in FIGS. 10A-C. The determination of the direction to the second wellbore may be performed in parallel with the determination of the distance to the second wellbore. For example, the average measurement described in 1112 may be determined for each of a plurality of azimuth sensors. The azimuth sensor with the highest average measurement may be determined by comparing the average measurement of the azimuth sensors. The average measurement may be represented by an azimuthal direction as described in FIG. 9B. For example, if the second wellbore is in proximity to the first wellbore the electrical arcs may be oriented to form in the direction of the second wellbore due to the conductivity of the electrical path at or near the casing of the second wellbore. Although an average measurement is described, individual measurements may be used in the inversion to determine the direction. The measurements may be organized into bins as shown in FIG. 9B. The first wellbore may avoid or maintain a distance from the second wellbore based on the determined distance and/or direction. Method 1100 may end after 1116, repeat, or continue to 1118.

Modifications, additions, or omissions may be made to method 1200 without departing from the scope of the disclosure. The order of the steps may be performed in a different manner than that described and some steps may be performed at the same time. Additionally, each individual step may include additional steps without departing from the scope of the present disclosure. For example, 1108 may be performed even if 1112 is performed.

Figure 12:
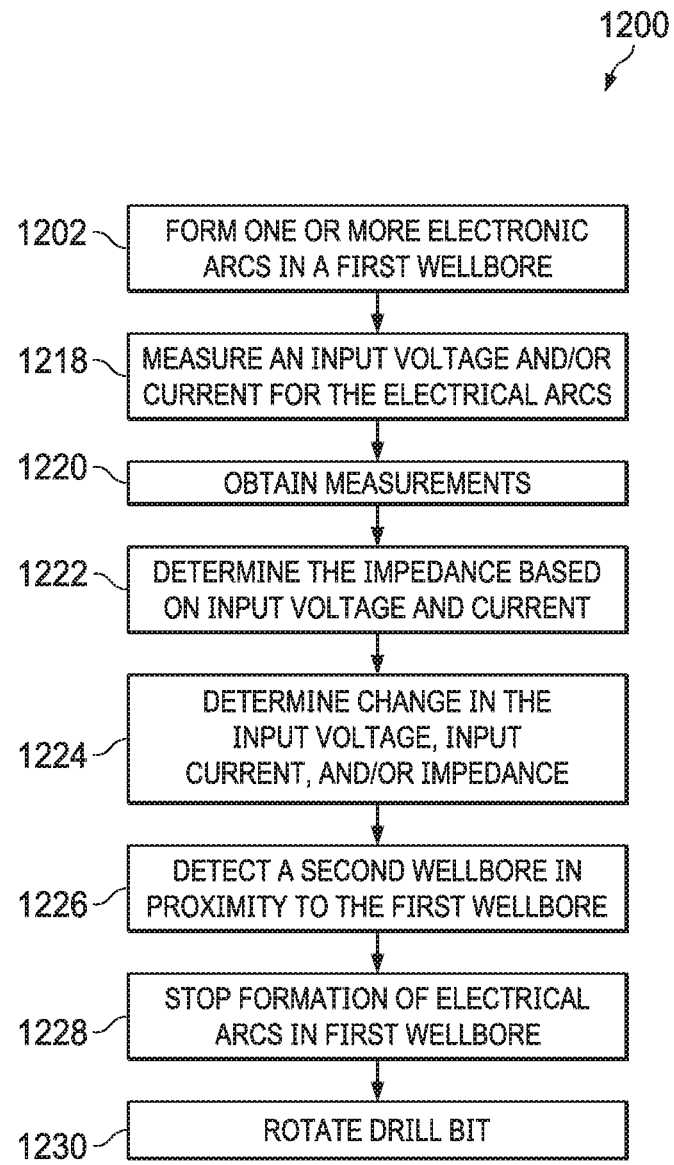
FIG. 12 is a flow chart of exemplary method for intercepting a wellbore.

FIG. 12 is a flow chart of exemplary method for intercepting a wellbore. As another example, method 1200 may begin if the distance between the first wellbore and second wellbore indicates that the two wellbores are in the vicinity of each other or if the first wellbore is intended to intercept the second wellbore. Method 1200 may begin and at 1202 one or more electrical arcs may be formed at the pulsed-power drill bit in a first wellbore. The electrical arcs may be formed between a first electrode and a second electrode of the drill bit. For example, the electrical arcs may form between electrode 208 and ground ring 250 in FIG. 2A, as shown by currents 725a and 725b in FIG. 7.

At 1204, one or more sensors may measure an input voltage and/or input current by recording responses to the electrical arcs or an electromagnetic wave generated by the electrical arcs. The input voltage may be derived from voltage source 720 in FIG. 7. The input current may be derived from current 735 in FIG. 7. The input voltage and/or input current may be measured by one or more sensors, such as the sensors described for 1108 and 1110 above. The input voltage and input current may be referred to herein as measurements.

At 1206, one or more measurements (such as those in 1204) may be obtained by a sensor analysis system, such as sensor analysis system 500 in FIG. 5.

At 1208, the impedance may be determined by the sensor analysis system based on the input voltage and input current. The impedance may represent the input impedance of the pulsed-power drill bit. When the pulsed-power drill bit is in proximity to the casing of the secondary wellbore, the bit may electrically short if the casing is metallic (such as steel). If the bit shorts, the impedance that is determined may be significantly lower than the impedance associated with the pulsed-power drill bit being further away of the second wellbore.

At 1210, the change in input voltage, input current, and/or impedance may be determined by the sensor analysis system. The system may store previous values of the input voltage, input current, and/or impedance and compare those values to the values obtained in 1204 and/or 1208.

At 1212, the second wellbore may be detected in proximity to the first wellbore by the sensor analysis system based on a comparison. For example, the comparison may involve the input voltage, input current, and/or impedance and a threshold. If the input voltage or impedance is below a threshold, the second wellbore may be detected in proximity to the first wellbore. If the input current is above a threshold, the second wellbore may be detected in proximity to the first wellbore. As another example, the comparison may involve the change in input voltage, input current, and/or impedance and a threshold. If the change in the value is above a threshold, the second wellbore may be detected in proximity to the first wellbore. In addition, if the drill bit in the first wellbore was previously shorted electrically to the second wellbore, a change in the impedance below a threshold may indicate that the second wellbore is in proximity to the first wellbore.

At 1214, the formation of electrical arcs at the pulsed-power drill bit may be stopped to avoid crushing the casing of the second wellbore. For example, the sensor analysis system may send a notification to the pulse generating circuit to stop generate high-energy electrical pulses which cause the electrical arcs to form.

At 1216, the drill bit may be rotated to breach the casing of the second wellbore to intercept the borehole. The drill bit may be the same drill bit as the pulsed-power drill bit or may be a separate non-pulsed-power drill bit that replaced the pulsed-power drill bit to remove rock or casing as the bit rotates. Subsequently, method 1200 may end or the operations in method 1200 may be repeated, as needed, to perform a pulsed drilling operation.

Modifications, additions, or omissions may be made to method 1200 without departing from the scope of the disclosure. The order of the steps may be performed in a different manner than that described and some steps may be performed at the same time. Additionally, each individual step may include additional steps without departing from the scope of the present disclosure.

Embodiments herein may include:

A. A downhole drilling system including a pulse-generating circuit; a drill bit including a first electrode and a second electrode, the first and second electrodes electrically coupled to the pulse-generating circuit to receive an electrical pulse from the pulse-generating circuit and to form an electrical between the first and second electrodes during a pulsed drilling operation in a first wellbore; a sensor to record responses to a magnetic field generated by a current in a second wellbore, the current generated by the electrical arc; and a sensor analysis system communicatively coupled to the sensor, the sensor analysis system configured to obtain a measurement from the sensor, the measurement representing the recorded response to the magnetic field and to determine a distance between the drill bit and the second wellbore based on the measurement.

B. A method including generating, by a drill bit, an electrical arc in a first wellbore during a pulsed drilling operation; recording a response to a magnetic field generated by a current in a second wellbore using a sensor in proximity to the drill bit, the current generated by the electrical arc; obtaining a measurement representing the recorded response to the magnetic field; and determining the distance to the second wellbore based on the measurement.

C. A sensor analysis system including a computer processor and a computer-readable medium for storing instructions, the instructions, when read and executed by the computer processor, to cause the processor to: receive a measurement from a sensor, the sensor communicatively coupled to the sensor analysis system to record responses during a pulsed drilling operation to a magnetic field generated by a current in a second wellbore, the current generated by an electrical arc between a first electrode and a second electrode of a drill bit in a first wellbore; and determine a distance between the drill bit and the second wellbore based on the measurement.

Each of embodiments A, B, and C may have one or more of the following additional elements in any combination: Element 1: the downhole drilling system further includes a plurality of azimuth sensors communicatively coupled to the sensor analysis system and positioned in proximity to the drill bit in the first wellbore, each of the plurality of azimuth sensors to record, during the pulsed drilling operation, responses to the electrical arc and a second electrical arc; and the sensor analysis system is further configured to obtain for each of the plurality of azimuth sensors a first measurement and a second measurement, the first measurement representing the recorded response to the electrical arc and the second measurement representing the recorded response to the second electrical arc; and determine a direction of the second wellbore based on the first measurement and the second measurement for at least one of the plurality of azimuth sensors. Element 2: wherein the sensor analysis system is further configured to: determine for each of the plurality of azimuth sensors an average measurement based on the on the first measurement and the second measurement; and determine an azimuth sensor among the plurality of azimuth sensors with a highest average measurement, the azimuth sensor with the highest average measurement being the azimuth sensor of the plurality of azimuth sensors used to determine a direction of the second wellbore. Element 3: wherein the first measurement and the second measurement are selected from the group consisting of voltages, currents, ratios between voltage and current and combination thereof. Element 4: wherein the plurality of azimuth sensors are battery powered. Element 5: wherein the downhole drilling system further includes a fiber optic cable coupled to the plurality of azimuth sensors, the fiber optic cable charged by a laser to provide power to the plurality of azimuth sensors. Element 6: wherein the sensor analysis system is further configured to transmit the measurement representing the recorded response to the magnetic field, the first measurement representing the recorded response to the electrical arc, and the second measurement representing the recorded response to the second electrical arc to a surface above the first wellbore using the fiber optic cable. Element 7: wherein the sensor analysis system placed on a surface above the first wellbore and is communicatively coupled to the sensor via a telemetry system, the telemetry system to transmit measurements from the sensor to the sensor analysis system. Element 8: the downhole drilling system further includes a plurality of azimuth sensors communicatively coupled to the sensor analysis system and positioned in proximity to the drill bit in the first wellbore, each of the plurality of azimuth sensors to record, during the pulsed drilling operation, responses to the electrical arc and a second electrical arc to generate an average measurement; and the sensor analysis system further configured to: obtain for each of the plurality of azimuth sensors the average measurement; and determine a direction of the second wellbore based on the average measurement for one of the plurality of the azimuth sensors. Element 9: the downhole drilling system further includes a sensor communicatively coupled to the sensor analysis system and positioned in proximity to the drill bit in the first wellbore to measure a voltage and a current for the electrical arc generated during the pulsed drilling operation; and the sensor analysis system further configured to: obtain the voltage and the current from the sensor; and determine an impedance at the drill bit in the first wellbore based on the voltage and current. Element 10: wherein the sensor analysis system is further configured to: determine whether the impedance is less than a threshold; and detect that the second wellbore is in proximity to the drill bit in the first wellbore based on a determination that the impedance is less than the threshold. Element 11: wherein the sensor analysis system is further configured to: detect a change in the impedance based on a comparison of the determined impedance and a second impedance, the determined impedance associated with the voltage and current measured at a first time and the second impedance associated with a measurement at a time prior to the first time; determine whether the impedance change is greater than a threshold; and detect that the second wellbore is in proximity to the drill bit in the first wellbore based on a determination that the impedance change is greater than the threshold. Element 12: wherein the pulse-generating circuit is configured to stop generation of electrical pulses based on the detection by the sensor analysis system of the second wellbore proximity to the drill bit. Element 13: wherein an angle between the first wellbore and the second wellbore is less than approximately 85 degrees. Element 14: wherein the sensor includes a first coil tilted in a first direction to record responses to the magnetic field. Element 15: wherein the downhole drilling system further includes a second sensor to record a response to the magnetic field generated by the current in the second wellbore, the second sensor comprising a second coil tilted in a second direction; and the sensor analysis system further configured to obtain a measurement from the second sensor, the measurement representing the response recorded by the second sensor. Element 16: wherein the sensor comprises a first magnetometer placed at a first azimuth around the first wellbore to record the response to the magnetic field. Element 17: the downhole drilling system further includes a second sensor to record a response to the magnetic field generated by the current in the second wellbore, the second sensor comprising a second magnetometer placed at a second azimuth around the first wellbore the sensor analysis system further configured to obtain a measurement from the second sensor, the measurement representing the response recorded by the second sensor. Element 18: wherein the response is recorded by the sensor is measured at a first frequency and a second frequency; and the sensor analysis system is further configured to determine a ratio of a measurement representing the response recorded by the sensor at the first frequency and another measurement representing the response recorded by the sensor at the second frequency, wherein the distance to the second wellbore is further based on the ratio. Element 19: wherein the sensor is placed in a third wellbore. Element 20: wherein the response is the magnitude of the magnetic field recorded by the sensor.

Although the present disclosure has been described with several embodiments, various changes and modifications may be suggested to one skilled in the art. It is intended that the present disclosure encompasses such various changes and modifications as falling within the scope of the appended claims.

What is claimed is:

1. A downhole drilling system, comprising:
    a pulse-generating circuit;
    a drill bit including a first electrode and a second electrode, the first and second electrodes electrically coupled to the pulse-generating circuit to receive an electrical pulse from the pulse-generating circuit and to form an electrical arc between the first and second electrodes during a pulsed drilling operation in a first wellbore, the electrical arc creating a primary magnetic field;
    a first sensor to record responses to a secondary magnetic field generated by a current in a second wellbore, the current induced by the primary magnetic field; and
    a sensor analysis system communicatively coupled to the first sensor, the sensor analysis system configured to:
        obtain a measurement from the first sensor, the measurement representing the recorded response to the secondary magnetic field at a point corresponding to a location of the first sensor; and
        determine a distance between the drill bit and the second wellbore based on the measurement.

2. The downhole drilling system of claim 1, further comprising:
    a plurality of azimuth sensors communicatively coupled to the sensor analysis system and positioned in proximity to the drill bit in the first wellbore, each of the plurality of azimuth sensors to record, during the pulsed drilling operation, responses to the electrical arc and a second electrical arc; and
    the sensor analysis system further configured to:
        obtain for each of the plurality of azimuth sensors a first measurement and a second measurement, the first measurement representing the recorded response to the electrical arc and the second measurement representing the recorded response to the second electrical arc, the first measurement and the second measurement selected from the group consisting of voltages, currents, ratios between voltage and current and combinations thereof;
        determine a direction of the second wellbore from the first wellbore based on the first measurement and the second measurement for at least one of the plurality of azimuth sensors;
        determine for each of the plurality of azimuth sensors an average measurement based on the first measurement and the second measurement; and
        determine an azimuth sensor among the plurality of azimuth sensors with a highest average measurement, the azimuth sensor with the highest average measurement being the azimuth sensor of the plurality of azimuth sensors used to determine the direction to the second wellbore.

3. The downhole drilling system of claim 2, further comprising:
    a fiber optic cable coupled to the plurality of azimuth sensors, the fiber optic cable charged by a laser to provide power to the plurality of azimuth sensors;
    wherein the plurality of azimuth sensors are battery powered; and
    wherein the sensor analysis system is further configured to transmit the measurement from the first sensor representing the recorded response to the secondary magnetic field at the point corresponding to the location of the first sensor, the first measurement representing the recorded response to the electrical arc, and the second measurement representing the recorded response to the second electrical arc to the surface using the fiber optic cable.

4. The downhole drilling system of any one of claim 1, wherein the sensor analysis system is placed on a surface above the first wellbore and communicatively coupled to the first sensor via a telemetry system, the telemetry system to transmit measurements from the first sensor to the sensor analysis system.

5. The downhole drilling system of claim 1, further comprising:
a plurality of azimuth sensors communicatively coupled to the sensor analysis system and positioned in proximity to the drill bit in the first wellbore, each of the plurality of azimuth sensors to record, during the pulsed drilling operation, responses to the electrical arc and a second electrical arc to generate an average measurement; and
the sensor analysis system further configured to:
obtain for each of the plurality of azimuth sensors the average measurement; and
determine a direction to the second wellbore from the first wellbore based on the average measurement for one of the plurality of the azimuth sensors.

6. The downhole drilling system of claim 1, further comprising:
a second sensor communicatively coupled to the sensor analysis system and positioned in proximity to the drill bit in the first wellbore to measure a voltage and a current for the electrical arc generated during the pulsed drilling operation; and
the sensor analysis system further configured to:
obtain the voltage and the current from the second sensor;
determine an impedance at the drill bit in the first wellbore based on the voltage and current;
determine whether the impedance is less than a first threshold;
detect that the second wellbore is in proximity to the drill bit in the first wellbore based on a determination that the impedance is less than the first threshold;
detect a change in the impedance based on a comparison of the determined impedance and a second impedance, the determined impedance associated with the voltage and current measured at a first time and the second impedance associated with a measurement at a time prior to the first time;
determine whether the impedance change is greater than a second threshold; and
detect that the drill bit in the first wellbore is in proximity to the second wellbore based on a determination that the impedance change is greater than the second threshold, the pulse-generating circuit configured to stop generation of electrical pulses based on detecting that the drill bit is in proximity to the second wellbore.

7. The downhole drilling system of claim 1, further comprising:
a second sensor to record a response to the secondary magnetic field generated by the current in the second wellbore, the first sensor comprising a first coil tilted in a first direction to record responses to the secondary magnetic field and the second sensor comprising a second coil tilted in a second direction; and
the sensor analysis system further configured to obtain a measurement from the second sensor, the measurement representing the response recorded by the second sensor.

8. The downhole drilling system of claim 1, further comprising:
a second sensor to record a response to the secondary magnetic field generated by the current in the second wellbore, the first sensor comprising a first magnetometer placed at a first azimuth around the first wellbore to record the response to the secondary magnetic field and the second sensor comprising a second magnetometer placed at a second azimuth around the first wellbore; and
the sensor analysis system further configured to obtain a measurement from the second sensor, the measurement representing the response recorded by the second sensor.

9. The downhole drilling system of claim 1, wherein:
the response is recorded by the first sensor at a first frequency and a second frequency; and
the sensor analysis system is further configured to determine a ratio of a measurement representing the response recorded by the first sensor at the first frequency and another measurement representing the response recorded by the first sensor at the second frequency, wherein the distance to the second wellbore is further based on the ratio.

10. A method, comprising:
generating, by a drill bit, an electrical arc in a first wellbore during a pulsed drilling operation, the electrical arc creating a primary magnetic field;
recording a response to a secondary magnetic field generated by a current in a second wellbore using a first sensor in proximity to the drill bit, the current induced by the primary magnetic field;
obtaining a measurement from the first sensor, the measurement representing the recorded response to the secondary magnetic field at a point corresponding to a location of the first sensor; and
determining the distance to the second wellbore based on the measurement.

11. The method of claim 10, further comprising:
recording, with each of a plurality of azimuth sensors, a response to a first electrical arc in the first wellbore and a response to a second electrical arc in the first wellbore;
obtaining, for each of the plurality of azimuth sensors, a first measurement representing the recorded responses to the first electrical arc and a second measurement representing the recorded responses to the second electrical arc, the first measurement and the second measurement are selected from the group consisting of voltages, currents, ratios between voltage and current and combinations thereof;
determining a direction of the second wellbore based on the first and second measurements for at least one of the plurality of azimuth sensors;
determining, for each of the plurality of azimuth sensors, an average measurement based on the first measurement and the second measurement; and
determining an azimuth sensor among the plurality of azimuth sensors with a highest average measurement, the azimuth sensor with the highest average measurement being the azimuth sensor of the plurality of azimuth sensors used to determine the direction to the second wellbore.

12. The method of claim 11, further comprising:
providing power to the plurality of azimuth sensors by charging a fiber optic cable coupled to the plurality of azimuth sensors; and
transmitting the measurement representing the recorded response to the electrical arc, the first measurement, and the second measurement to a surface above the first wellbore using the fiber optic cable.

13. The method of claim 10, further comprising:
recording, with each of a plurality of azimuth sensors during the pulsed drilling operation, responses to the electrical arc and a second electrical arc to generate an average measurement;
obtaining, for each of the plurality of azimuth sensors, the average measurement; and
determining the direction to the second wellbore based on the average measurement for one of the plurality of azimuth sensors.

14. The method of claim 10, further comprising:
measuring a voltage and a current for the electrical arcs generated by the drill bit during the pulsed drilling operation;
obtaining the voltage and current measured by the first sensor during the pulsed drilling operation; and
determining an impedance at the drill bit in the first wellbore based on the voltage and current measurements;
determining whether the impedance is less than a first threshold; and
detecting that the second wellbore is in proximity to the drill bit in the first wellbore based on the determination that the impedance is less than the first threshold;
detecting a change in the impedance by comparing the determined impedance and a second impedance, the determined impedance associated with the voltage and current measured at a first time and the second impedance associated with a measurement at a time prior to the first time;
determining whether the impedance change is greater than a second threshold;
detecting that the drill bit in the first wellbore is in proximity to the second wellbore based on a determination that the impedance change is greater than the second threshold; and
stopping the drill bit from generating additional electrical arcs based on the detecting that the drill bit is in proximity to the second wellbore.

15. The method of claim 10, wherein the response to the secondary magnetic field is recorded by the first sensor tilted in a first direction and a second sensor tilted in a second direction.

16. The method of claim 10, wherein the response is recorded by a first magnetometer placed at a first azimuth around the first wellbore and a second magnetometer placed at a second azimuth around the first wellbore.

17. The method of claim 10, further comprising:
determining a ratio of a measurement representing the response recorded by the first sensor at a first frequency and another measurement representing the response recorded by the first sensor at a second frequency, wherein the distance to the second wellbore is further based on the ratio.

18. A sensor analysis system, comprising:
a computer processor;
a computer-readable medium for storing instructions, the instructions, when read and executed by the computer processor, to cause the processor to:
receive a measurement from a first sensor, the first sensor communicatively coupled to the computer processor to record responses during a pulsed drilling operation with an electrical arc formed between a first electrode and a second electrode of a drill bit in a first wellbore, the electrical arc creating a primary magnetic field, wherein the measurement represents the recorded responses to a secondary magnetic field at a point corresponding to a location of the first sensor, the secondary magnetic field generated by a current in a second wellbore, the current induced by the primary magnetic field; and
determine a distance between the drill bit and the second wellbore based on the measurement.

19. The sensor analysis system of claim 18, wherein the instructions, when read and executed by the computer processor, to further cause the processor to:
receive, for each of a plurality of azimuth sensors communicatively coupled to the computer processor, a first measurement and a second measurement, the first measurement representing a recorded response to the electrical arc and the second measurement representing a recorded response to a second electrical arc, the plurality of azimuth sensors:
positioned in proximity to the drill bit in the first wellbore, the first measurement and the second measurement selected from the group consisting of voltages, currents, ratios between voltage and current and combinations thereof, each of the plurality of azimuth sensors to record, during the pulsed drilling operation, responses to the electrical arc and the second electrical arc;
determine a direction of the second wellbore based on the first measurement and the second measurement for at least one of the plurality of azimuth sensors;
determine for each of the plurality of azimuth sensors an average measurement based on the first measurement and the second measurement;
determine an azimuth sensor among the plurality of azimuth sensors with a highest average measurement, the azimuth sensor with the highest average measurement being the azimuth sensor of the plurality of azimuth sensors used to determine the direction to the second wellbore; and
transmit the measurement representing the recorded response to the secondary magnetic field at the point corresponding to the location of the first sensor, the first measurement representing the recorded response to the electrical arc, and the second measurement representing the recorded response to the second electrical arc to a surface above the first wellbore.

20. The sensor analysis system of claim 19, wherein the measurement is received from the first sensor via a telemetry system and the sensor analysis system is placed on a surface above the first wellbore.

21. The sensor analysis system of claim 18, wherein the instructions, when read and executed by the computer processor, to further cause the processor to:
receive, for each of a plurality of azimuth sensors communicatively coupled to the computer processor, an average measurement, the plurality of azimuth sensors:
positioned in proximity to the drill bit in the first wellbore, each of the plurality of azimuth sensors to record, during the pulsed drilling operation, responses to the electrical arc and a second electrical arc to generate the average measurement; and determine a direction of the second wellbore based on the average measurement for at least one of the plurality of azimuth sensors.

22. The sensor analysis system of claim 18, wherein the instructions, when read and executed by the computer processor, to further cause the processor to:
receive a voltage and a current measured by a second sensor during the pulsed drilling operation, the second sensor positioned in proximity to the drill bit in the first wellbore to measure the voltage and the current for the electrical arc generated during the pulsed drilling operation;
determine an impedance at the drill bit in the first wellbore based on the voltage and current;
determine whether the impedance is less than a first threshold;
detect that the second wellbore is in proximity to the drill bit in the first wellbore based on a determination that the impedance is less than the first threshold;
detect a change in the impedance based on a comparison of the determined impedance and a second impedance, the determined impedance associated with the voltage and current measured at a first time and the second impedance associated with a measurement at a time prior to the first time;
determine whether the impedance change is greater than a second threshold;
detect that the drill bit in the first wellbore is in proximity to the second wellbore based on a determination that the impedance change is greater than the second threshold; and
send a notification to stop generation of electrical pulses based detecting that the drill bit is in proximity to the second wellbore.

23. The sensor analysis system of claim 18, wherein the instructions, when read and executed by the computer processor, to further cause the processor to:
determine a ratio of a measurement representing the response recorded by the first sensor at a first frequency and another measurement representing the response recorded by the first sensor at a second frequency, wherein the distance to the second wellbore is further based on the ratio.

* * * * *